United States Patent
Marshak et al.

(10) Patent No.: US 8,566,546 B1
(45) Date of Patent: Oct. 22, 2013

(54) TECHNIQUES FOR ENFORCING CAPACITY RESTRICTIONS OF AN ALLOCATION POLICY

(75) Inventors: Marik Marshak, Newton, MA (US); Alex Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 412 days.

(21) Appl. No.: 12/924,430

(22) Filed: Sep. 27, 2010

(51) Int. Cl.
*G06F 12/00* (2006.01)

(52) U.S. Cl.
USPC .................. 711/165; 711/112; 711/E12.002; 711/E12.009

(58) Field of Classification Search
None
See application file for complete search history.

(56) References Cited

U.S. PATENT DOCUMENTS

| | | | |
|---|---|---|---|
| 5,206,939 | A | 4/1993 | Yanai et al. |
| 5,778,394 | A | 7/1998 | Galtzur et al. |
| 5,845,147 | A | 12/1998 | Vishlitzky et al. |
| 5,857,208 | A | 1/1999 | Ofek |
| 7,822,939 | B1 | 10/2010 | Veprinsky et al. |
| 2008/0091748 | A1* | 4/2008 | Beniyama et al. ............ 707/205 |
| 2009/0070541 | A1 | 3/2009 | Yochai |
| 2009/0276588 | A1* | 11/2009 | Murase ........................ 711/160 |

OTHER PUBLICATIONS

Marshak, et al., "Techniques for Automated Evaluation and Movement of Data Between Storage Tiers," U.S. Appl. No. 12/803,571, filed Jun. 30, 2010.
Naamad, et al., "Analysis Tool for a Multi-Tier Storage Environment," U.S. Appl. No. 12/798,097, filed Mar. 30, 2010.
Marshak, et al., "Techniques for Dynamic Data Storage Configuration in Accordance With an Allocation Policy," U.S. Appl. No. 12/803,570, filed Jun. 30, 2010.

* cited by examiner

*Primary Examiner* — Reginald Bragdon
*Assistant Examiner* — Thanh D Vo
(74) *Attorney, Agent, or Firm* — Muirhead and Saturnelli, LLC

(57) ABSTRACT

Described are techniques for enforcing an allocation policy. Information is received that describes one or more storage groups. Each of the storage groups includes one or more thin devices. Each of the thin devices includes a plurality of chunks of storage allocated on one or more of a plurality of storage tiers. For each of the one or more storage groups, a plurality of counters is determined indicating amounts of storage currently allocated from the plurality of storage tiers for use by the storage group. Using the plurality of counters, it is determined whether each of the one or more storage groups violates thresholds included in an allocation policy associated with each storage group. Each of the thresholds specifies a maximum amount of storage of one of the plurality of storage tiers that can be used by each storage group.

17 Claims, 23 Drawing Sheets

TECHNIQUES FOR ENFORCING CAPACITY RESTRICTIONS OF AN ALLOCATION POLICY

BACKGROUND

1. Technical Field

This application generally relates to data storage, and more particularly to techniques used in connection with data storage configuration.

2. Description of Related Art

Computer systems may include different resources used by one or more host processors.

Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method for enforcing an allocation policy comprising: receiving information describing one or more storage groups, each of said storage groups including one or more thin devices, each of said thin devices including a plurality of chunks of storage allocated on one or more of a plurality of storage tiers; determining, for each of said one or more storage groups, a plurality of counters for said each storage group indicating amounts of storage currently allocated from said plurality of storage tiers for use by said each storage group; and determining, using said plurality of counters, whether each of said one or more storage groups violates thresholds included in an allocation policy associated with said each storage group, each of said thresholds specifying a maximum amount of storage of one of said plurality of storage tiers that can be used by said each storage group. For each thin device in each of said storage groups, a plurality of counters may be maintained indicating amounts of storage allocated from said plurality of storage tiers for use by said each thin device. For each of the one or more storage groups violating one or more thresholds in said allocation policy, the method may further comprise identifying one or more data movement candidates for said each storage group, each of said data movement candidates identifying data of said each storage group to be moved from a first of said plurality of storage tiers to a second of said plurality of storage tiers. The one or more data movement candidates may be determined in accordance with alleviating or reducing a violation of one of said thresholds. Each of the data movement candidates may identify one or more chunks of storage of said first storage tier which has data stored thereon for a first of said one or more thin devices of said each storage group. A current amount of storage of said first tier currently allocated for use by said each storage group may violate one of said thresholds. Each of the one or more storage groups may violate one or more thresholds in said allocation policy and the method may further include determining, using said plurality of counters maintained for each thin device, whether said each thin device has storage allocated from one of said plurality of storage tiers determined to have a threshold violation. Each time storage of said plurality of storage tiers is allocated or deallocated for use by a first thin device in a first of said one or more storage groups, said plurality of counters for said first storage group and said plurality of counters maintained for said first thin device may be appropriately updated in accordance with an amount of storage allocated or deallocated. For each of the one or more storage groups that violates thresholds included in an allocation policy associated with said each storage group, an entry may be placed in one of a plurality of capacity violation queues. The plurality of capacity violation queues may include a different queue for each of a plurality of priorities. Each storage group that violates said thresholds may have a first of said plurality of priorities and may be placed in one of said plurality of capacity violation queues associated with said first priority. If there are one or more storage groups violating one or more thresholds in said allocation policy, the method may further comprise processing said plurality of capacity violation queues to identify one or more data movement candidates where each of said data movement candidates identifying data of one of said storage groups having an entry in one of said plurality of capacity violation queues to be moved from a first of said plurality of storage tiers to a second of said plurality of storage tiers. Each of the data movement candidates may alleviate or reduce an amount by which one of said thresholds is exceeded for one of said storage groups. A frequency may be associated with each of said plurality of capacity violation queues where the frequency affects an amount of times said each capacity violation queue is selected in said processing relative to others of said plurality of capacity violation queues. The plurality of storage tiers may include a first storage tier of one or more flash memory devices and a second storage tier of one or more physical devices having lower performance characteristics than said one or more flash memory devices. Each of the thresholds may be any of a percentage of a total storage capacity of said each storage group, a percentage of a total storage capacity of one of said plurality of storage tiers, and an integer indicating an amount of storage units. The allocation policy may be associated with at least two of said plurality of storage tiers and may include at least two maximum thresholds corresponding to said at least two plurality of tiers. A sum of the at least two maximum thresholds for said at least two plurality of tiers may represent a storage capacity which is more than a storage capacity of said each storage group. The second storage tier may be determined using any of random selection of one of said plurality of storage tiers, performance characteristics of said second storage tier indicating a greater performance level than performance characteristics of said first storage tier, and a current work load associated with a portion of said first storage tier upon which said data is stored. The processing may be performed using budgets associated with said plurality storage groups having entries in said plurality of capacity violation queues, and, for each of said plurality of storage groups having an entry in said plurality of capacity violation queues, budgets associated with thin devices of said storage group. The budgets may be specified as amounts of data to be moved.

In accordance with another aspect of the invention is a computer readable medium comprising code stored thereon for enforcing an allocation policy comprising, the computer readable medium comprising code stored thereon that: receives information describing one or more storage groups, each of said storage groups including one or more thin devices, each of said thin devices including a plurality of chunks of storage allocated on one or more of a plurality of storage tiers; determines, for each of said one or more storage groups, a plurality of counters for said each storage group indicating amounts of storage currently allocated from said plurality of storage tiers for use by said each storage group; and determines, using said plurality of counters, whether each of said one or more storage groups violates thresholds included in an allocation policy associated with said each storage group, each of said thresholds specifying a maximum amount of storage of one of said plurality of storage tiers that can be used by said each storage group.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
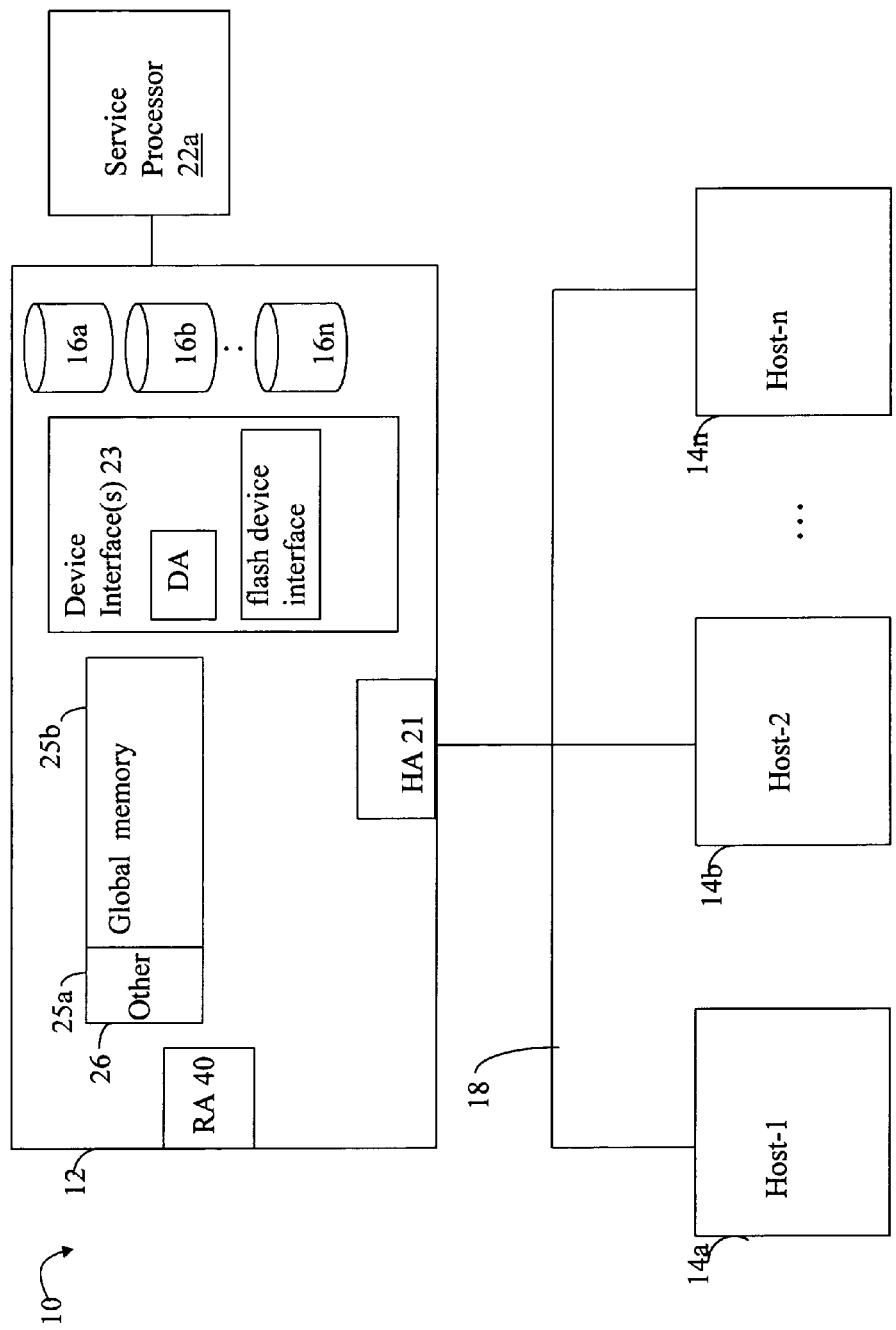
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
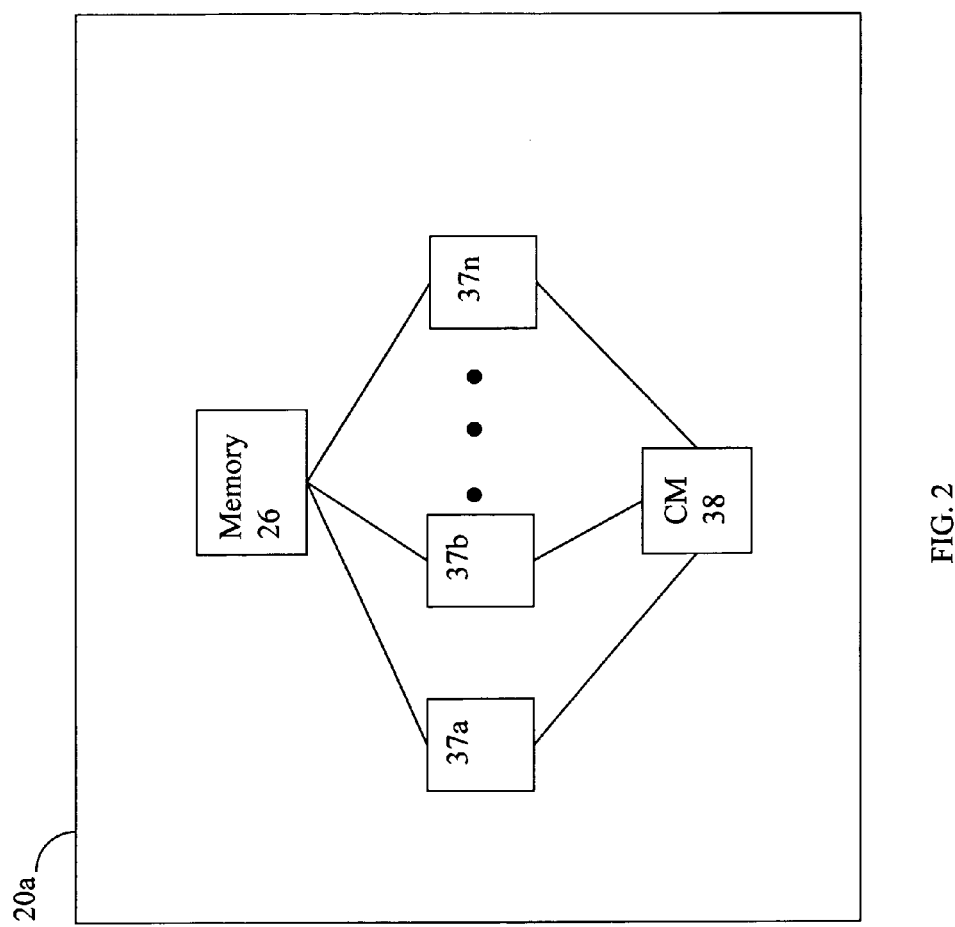
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
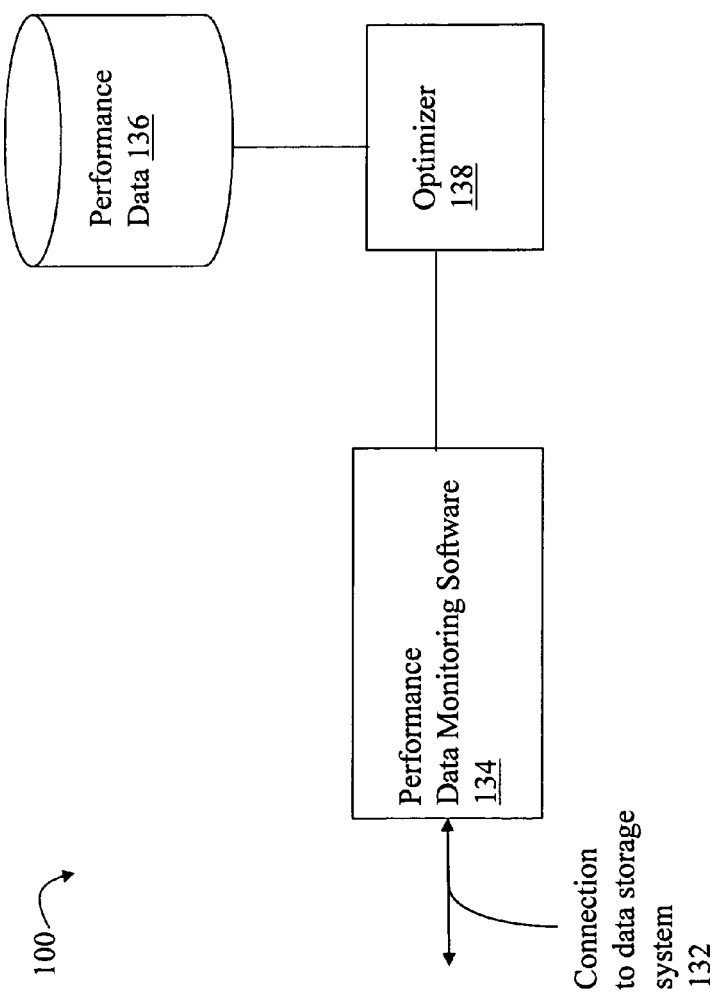
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 36 may be used by the optimizer to determine metrics described and used in connection with techniques herein. The optimizer may access the performance data, for example, collected for a plurality of LVs when performing a data storage optimization. The performance data 36 may be used in determining a workload for one or more physical devices, logical devices or volumes (LVs) and the like. The workload may also be a measurement or level of "how busy" a device is, for example, in terms of I/O operations (e.g., I/O throughput such as number of I/Os/second, and the like). The optimizer 38 may perform processing of the techniques herein set forth in following paragraphs to determine how to allocate or partition physical storage in a multi-tiered environment for use by multiple applications. The optimizer 38 may also perform other processing such as, for example, to determine what particular LVs to store on physical devices of a particular tier, evaluate when to migrate or move data between physical drives of different tiers or within the same tier, and the like. It should be noted that the optimizer 138 may generally represent one or more components that perform processing as described herein as well as one or more other optimizations and other processing that may be performed in an embodiment.

Described in following paragraphs are techniques that may be performed to determine how to allocate or partition physical storage of multiple storage tiers for use by a plurality of applications. Such a determination may be made in accordance with one or more criteria including an allocation policy. The criteria may also include, for example, a priority, one or more performance metrics used to evaluate workloads, and the like. As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy. The techniques herein may performed at subsequent times during operation of the data storage system to re-evaluate the current partitioning of the different storage tiers amongst the applications. The techniques herein may use other criteria, such as application and/or device workload (e.g., such as may be determined based on observed performance measurements), to determine the partitioning. Criteria, such as the workload, may change over time and thus so may the partitioning. However, any physical storage allocation partitioning of the multiple storage tiers for applications may be subject to the thresholds of the associated allocation policies. Use of maximum thresholds allows for flexibility in that it does not result in allocating or reserving a fixed amount of resources. As such, an embodiment may perform other optimizations such as based on application workload and may vary the amount of physical storage of the multiple tiers allocated for use by an application subject to any such maximum threshold.

In accordance with techniques herein, an embodiment may determine amounts of the different storage tiers used by an application subject to the allocation policy and possibly other criteria using a variety of different techniques. As described in following paragraphs, such criteria may also include a priority associated with an application and its data. Such criteria may also include one or more performance metrics indicating a workload of the application. For example, an embodiment may determine one or more performance metrics using collected or observed performance data for a plurality of LVs used by the application. Thus, the partitioning of the different storage tiers among multiple applications may also take into account the workload or how "busy" an application is. There may be a tendency to use the storage tiers having higher performance characteristics (e.g., those tiers of physical drives providing higher I/O throughput, having lower latency times, and the like) for those applications having the higher workloads. However, an embodiment may also perform the foregoing subject to other criteria, such as an application's priority, so that a single application may not consume all the capacity, or exceed specified limits of, a high performance tier. For example, it may be undesirable to have a single application consume all of the flash devices in the highest performance tier thereby causing a severe performance degradation of all other applications. The priority may also be used, for example, as an additional criteria to assist in partitioning storage tiers among multiple applications having substantially the same workloads.

As an example, the techniques herein may be described with reference to a storage environment having three storage tiers—a first tier of only flash drives in the data storage system, a second tier of only FC drives, and a third tier of only SATA drives. In terms of performance, the foregoing three tiers may be ranked from highest to lowest as follows: first, second, and then third. The lower the tier ranking, the lower the tier's performance characteristics (e.g., longer latency times, capable of less I/O throughput/second, and the like). Generally, different types of physical devices or physical drives have different types of characteristics. There are different reasons why one may want to use one storage tier and type of drive over another depending on criteria, goals and the current performance characteristics exhibited in connection with performing I/O operations. In this example, the first tier of flash drives may be characterized as cost effective in terms of performance for data access and retrieval. The third tier of SATA drives may be characterized as cost effective in terms of storage capacity. For example, flash drives of the first tier may be a best choice or candidate for storing LVs which may be characterized as I/O intensive or "busy" thereby experiencing a high rate of I/Os to frequently access the physical storage device containing the LV's data. However, flash drives tend to be expensive in terms of storage capacity. SATA drives may be a best choice or candidate for storing LVs requiring a large storage capacity and which are not I/O intensive with respect to access and retrieval from the physical storage device. The second tier of FC drives may be characterized as "in between" flash drives and SATA drives in terms of cost/GB and I/O performance. Thus, in terms of relative performance characteristics, flash drives may be characterized as having higher performance than both FC and SATA, and FC may be characterized as having a higher performance than SATA.

As may be observed with respect to data storage systems, a typical or general usage characteristic is that a small amount of the storage capacity tends to be associated with a large amount of the I/O activity, such as read and write operations. For example, 80% of all I/Os may be associated with 20% of the total storage capacity. Since flash drives of the first tier are the most expensive of all tiers in terms of dollars/GB, processing may be performed to determine which of the LVs are characterized as most I/O intensive and therefore may be good candidates to have their data stored on flash drives. Similarly, the second most I/O intensive LVs may be good candidates to store on FC drives of the second tier and the least I/O intensive LVs may be good candidates to store on SATA drives of the third tier. As such, workload for an application may be determined using some measure of I/O intensity, performance or activity (e.g., I/O throughput/second, percentage of read operation, percentage of write operations, etc.) of each LV used for the application's data. Some measure of workload may be used as a factor or criterion in combination with others described herein for partitioning an amount of physical storage of the different storage tiers for use by each application.

Figure 4:
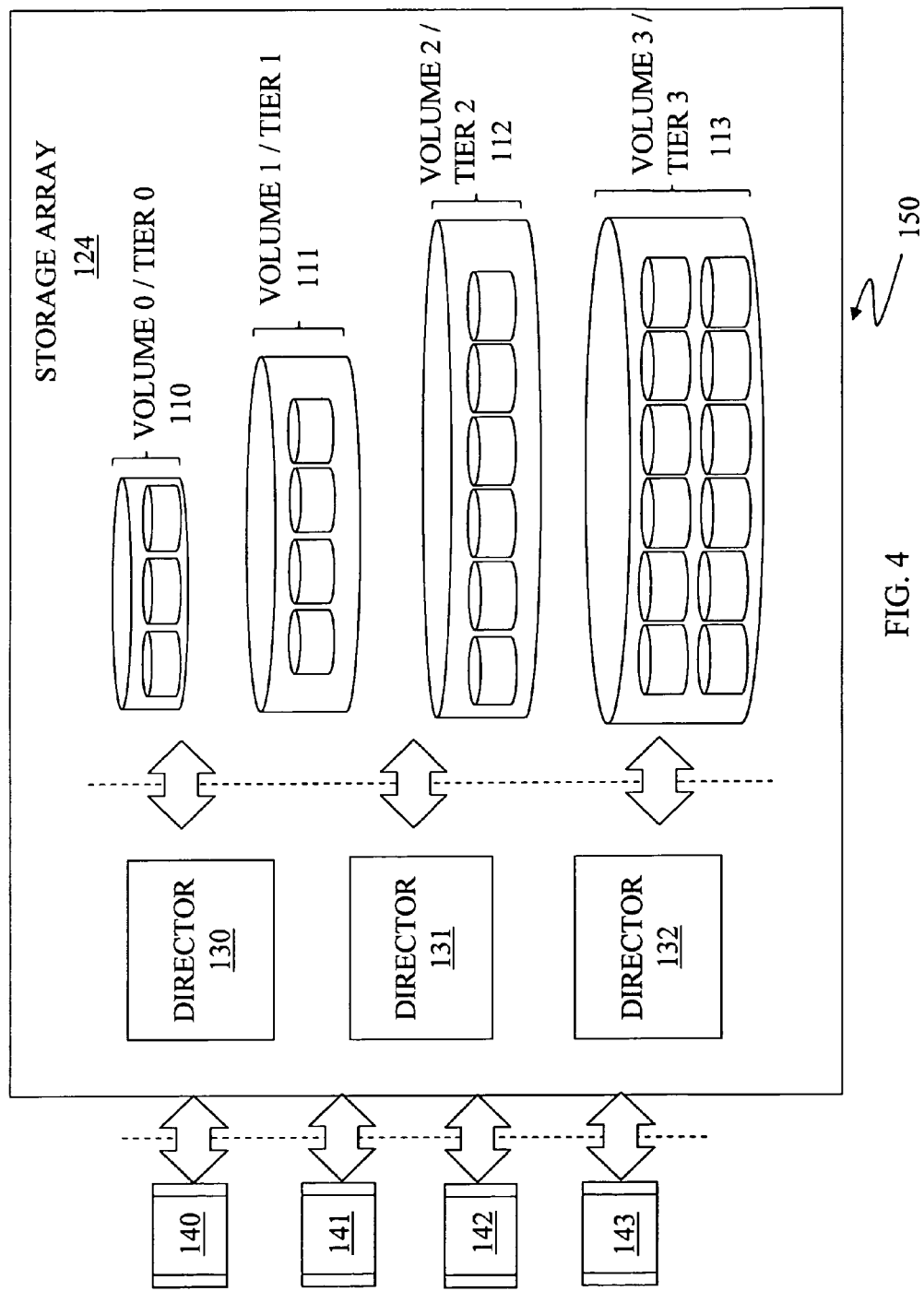
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs. The techniques herein may be used to determine amounts or allocations of each storage tier used by each application. Other suitable techniques may be used to determine more specifically which of an application's data to locate in possibly different tiers allocated for use by the application. At a later point in time, the techniques herein may be used to repartition the storage tiers among the different applications. In accordance with such repartitioning, data may also be moved between tiers.

Figure 5A:
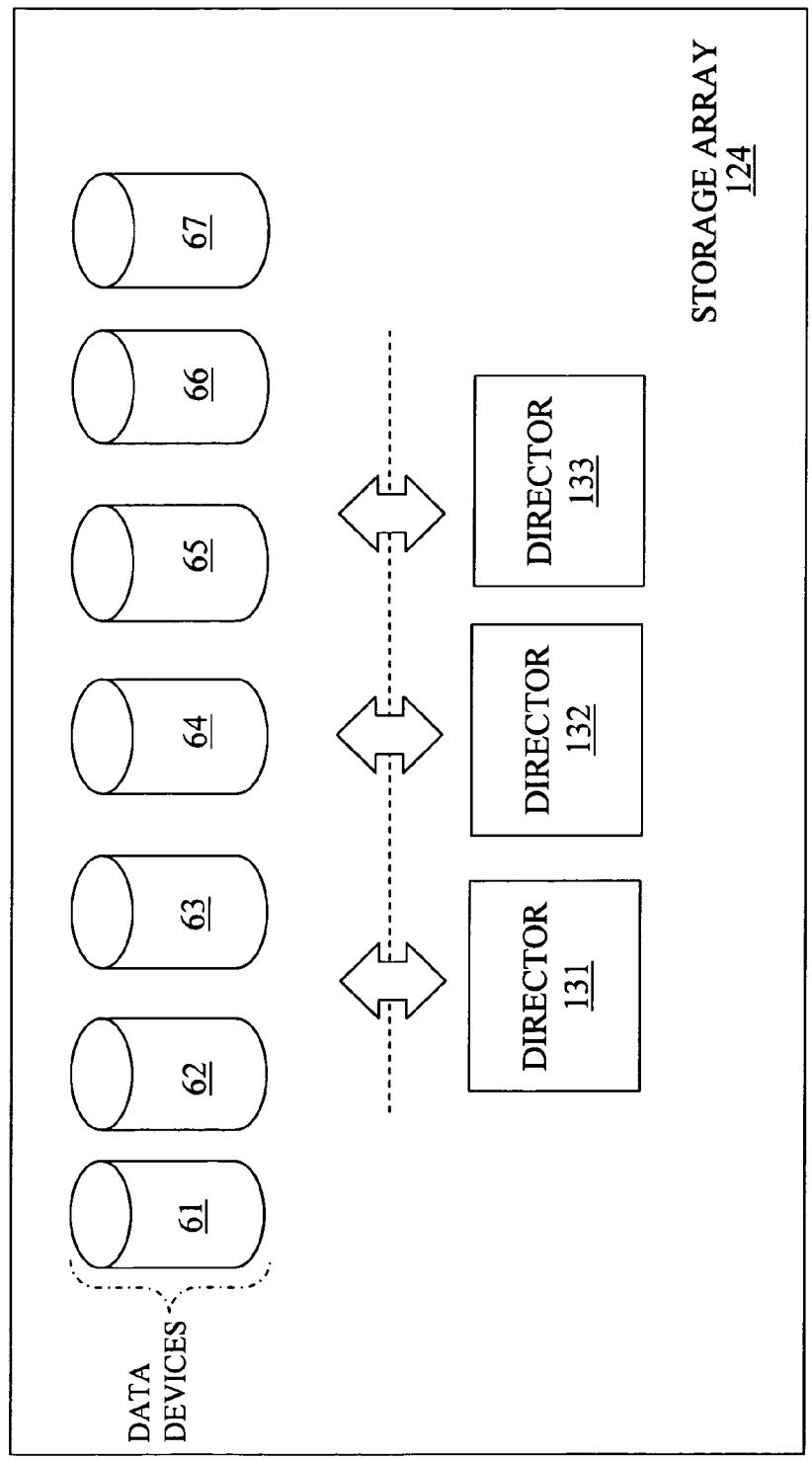

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-68 may be sections of one data device.

Figure 5B:
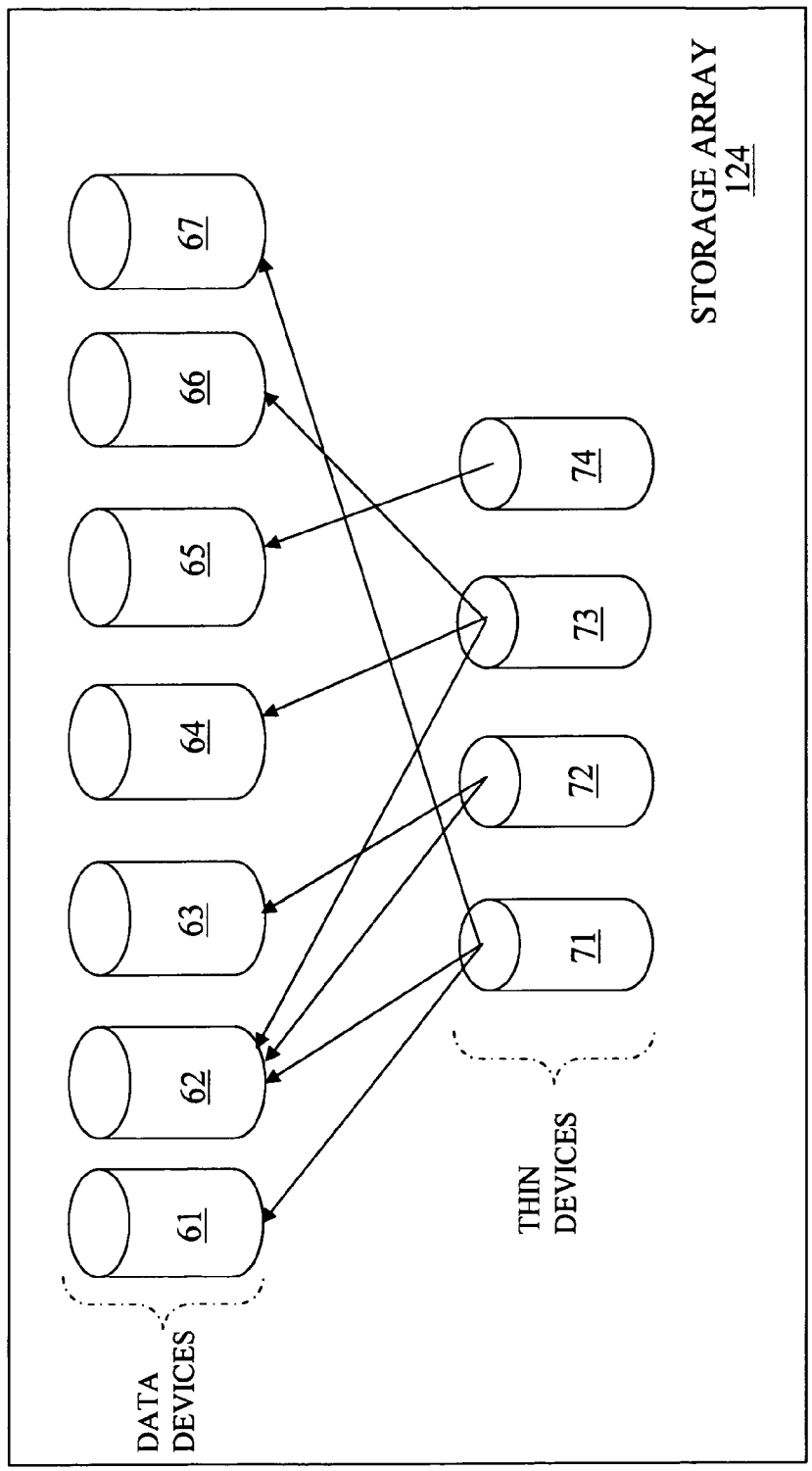

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof).

Figure 5C:
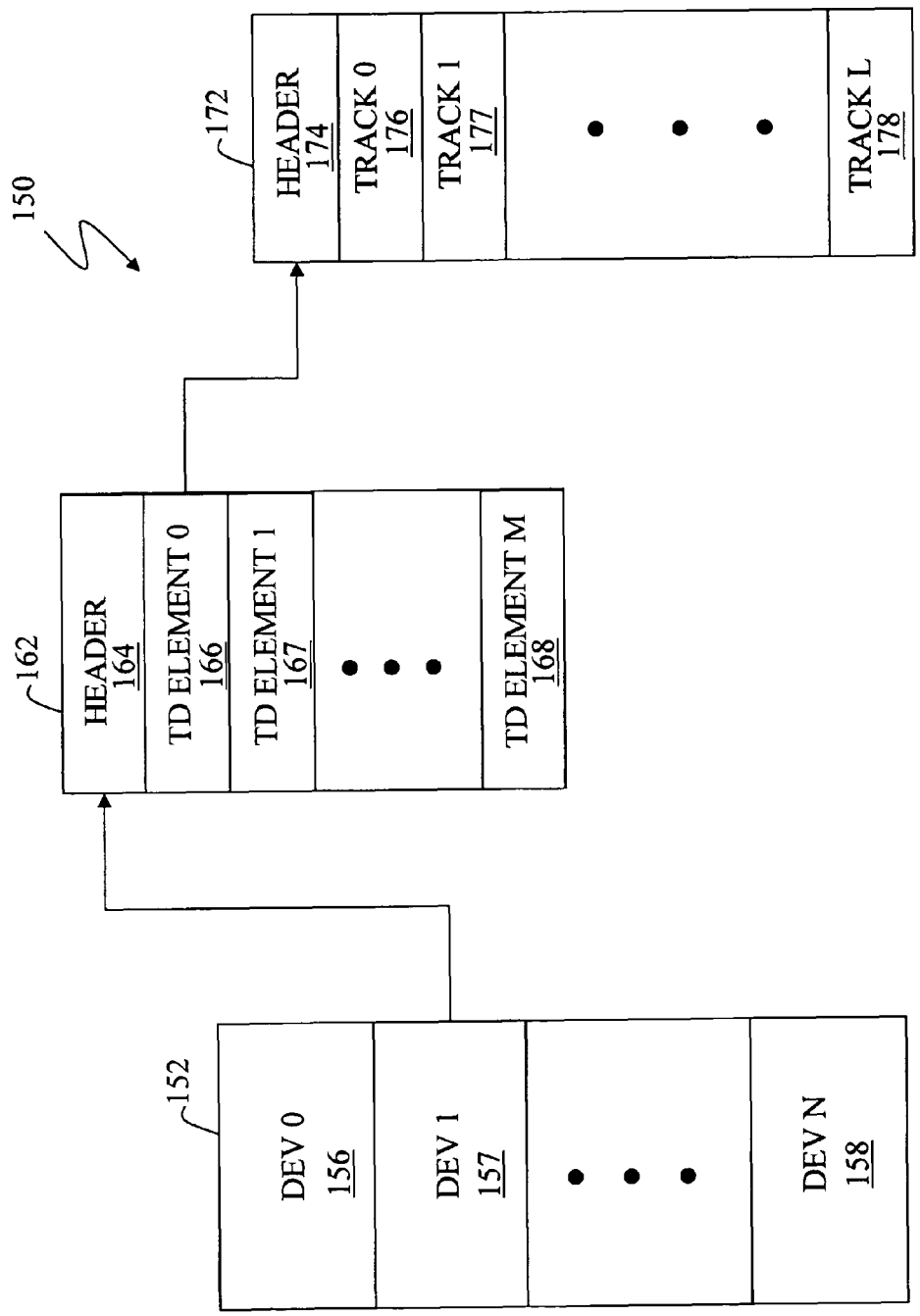
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA and/or a DA. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
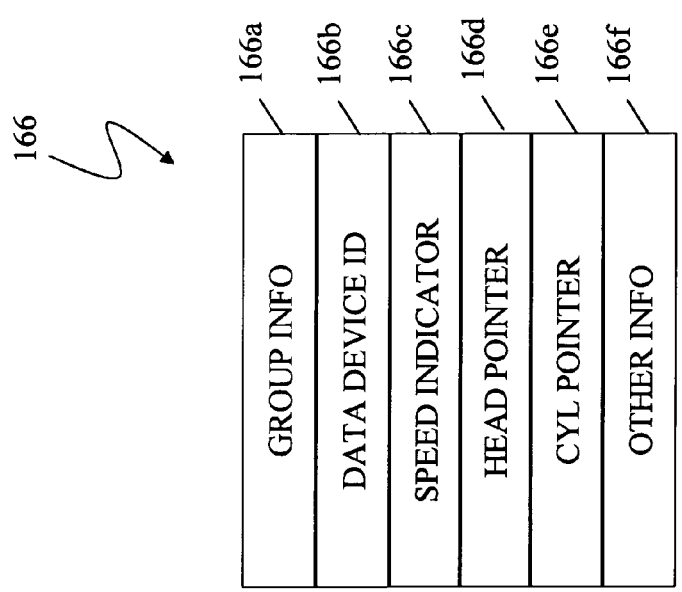
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. patent application Ser. No. 11/903,869, filed Sep. 25, 2007, DATA DE-DUPLICATION USING THIN PROVISIONING, Veprinsky et al., EMS-177US, both of which are incorporated by reference herein.

As discussed elsewhere herein, the data devices 61-67 (such as LVs or other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, multiple logical devices or LVs may be concatenated and appear to the host as a single metavolume.

In accordance with techniques herein, an embodiment may allow for locating all of the data of a single logical portion or entity in a same tier or in multiple different tiers depending on the logical data portion or entity. For example, in one embodiment, all data associated with a single LV or logical device visible to the host may be located in the same tier. A metavolume may be accessible to the host as a single logical entity and an embodiment in accordance with techniques herein may locate all data of a single metavolume in the same tier. In an embodiment including thin devices, the techniques herein may be used where different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

For simplicity of illustration, examples set forth in following paragraphs may refer to LVs or logical devices. However, other logical data entities such as metavolumes and thin devices may also be used.

Figure 6:
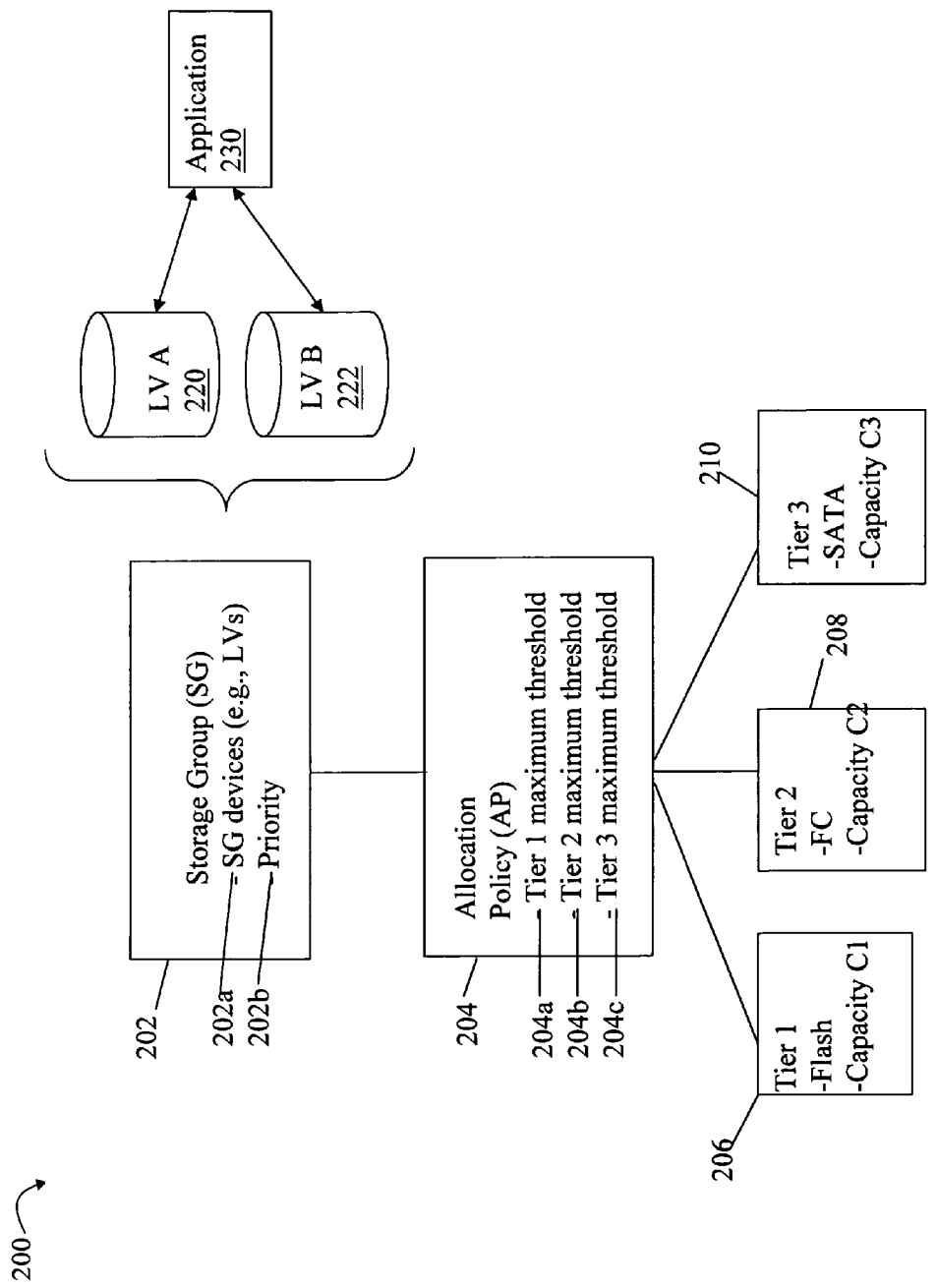
FIGS. 6 and 7 are examples illustrating a storage group, allocation policy and associated storage tiers in an embodiment in accordance with techniques herein.

Referring to FIG. 6, shown is an example illustrating information that may be defined and used in connection with techniques herein. The example 200 includes multiple storage tiers 206, 208, and 210, an allocation policy (AP) 204, and storage group (SG) 202. The SG 202 may include one or more LVs, such as LV A 220 and LV B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the LVs 220 and 222. It should be noted that the particular number of tiers, LVs, and the like, should not be construed as a limitation. An SG may represent a logical grouping of LVs used by a single application although an SG may correspond to other logical groupings for different purposes. An SG may, for example, correspond to LVs used by multiple applications.

Each of 206, 208 and 210 may correspond to a tier definition as described elsewhere herein. Element 206 represents a first storage tier of flash drives having a tier capacity C1. Element 208 represents a first storage tier of FC drives having a tier capacity C2. Element 210 represents a first storage tier of SATA drives having a tier capacity C3. The AP 204 may be associated with one of more SGs such as SG 202. The AP 204 specifies, for an associated SG, a capacity upper limit or maximum threshold for one or more storage tiers. Each such threshold may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes threshold 204a identifying a maximum threshold for tier1, threshold 204b identifying a maximum threshold for tier2, and threshold 204c identifying a maximum threshold for tier3. The SG 202 may be based on an SG definition identifying 202a the logical devices, such as LVs included in the SG, and an application or SG priority 202b. The priority 202b may be user-specified and may identify a relative importance or priority of the application 230 having data of the SG 202. The priority 202b may be one of a plurality of defined priority levels such as LOW, MEDIUM, and HIGH indicating a relative priority of this application 230 to other applications that may have data stored on devices of the same storage system. The priority may be used along with other criteria in accordance with techniques herein to partition the capacity of the multiple storage tiers for use by the multiple applications. Examples are described in more detail elsewhere herein.

In connection with techniques herein, the maximum thresholds 204a, 204b and 204c each represent an upper bound of a storage capacity. The techniques herein may be used to partition less than the amount or capacity represented by such thresholds. An amount of physical storage of a tier allocated for use by an application is allowed to vary up to that threshold in accordance with other criteria associated with the application such as, for example, varying application workload. Thus, at a first point in time, an optimizer may analyze current workloads of the various applications and may be allowed to vary the amount or partitioning of storage capacity of each tier used by each application subject to any such maximum thresholds of the associated APs. The optimizer may vary such partitioning based on workload and possibly other criteria when performing a cost benefit analysis. At a second point in time, the workloads and possibly other criteria for the applications may change and the optimizer may repartition the storage capacity used by each application subject to the maximum thresholds of the associated APs. Thus, the optimizer has additional flexibility in partitioning capacities of the storage tiers for application data by being allowed to consider, at a single point in time, different partitioning options evaluated as "best" and subject to the AP thresholds. The foregoing is in contrast to hard or fixed capacities. Thus, the thresholds allow a system to perform optimizations based on workload changes subject to any thresholds without having a requirement of reserving a total capacity indicated by the threshold. Thus, the optimizer has additional flexibility in resource allocations in accordance with techniques herein and may consider various candidate partitioning options at a single point in time.

An embodiment may include definitions for the different SGs, APs, tiers and associations therebetween. Such information may be stored in a memory, data container, or other location on the data storage system, or otherwise accessible to the data storage system, for use in connection with techniques herein.

In an embodiment, each SG may include one or more thick devices or one or more thin devices. Various restrictions for a given SG, such as whether an embodiment allows an SG to include both thick and thin devices, may vary.

Figure 7:
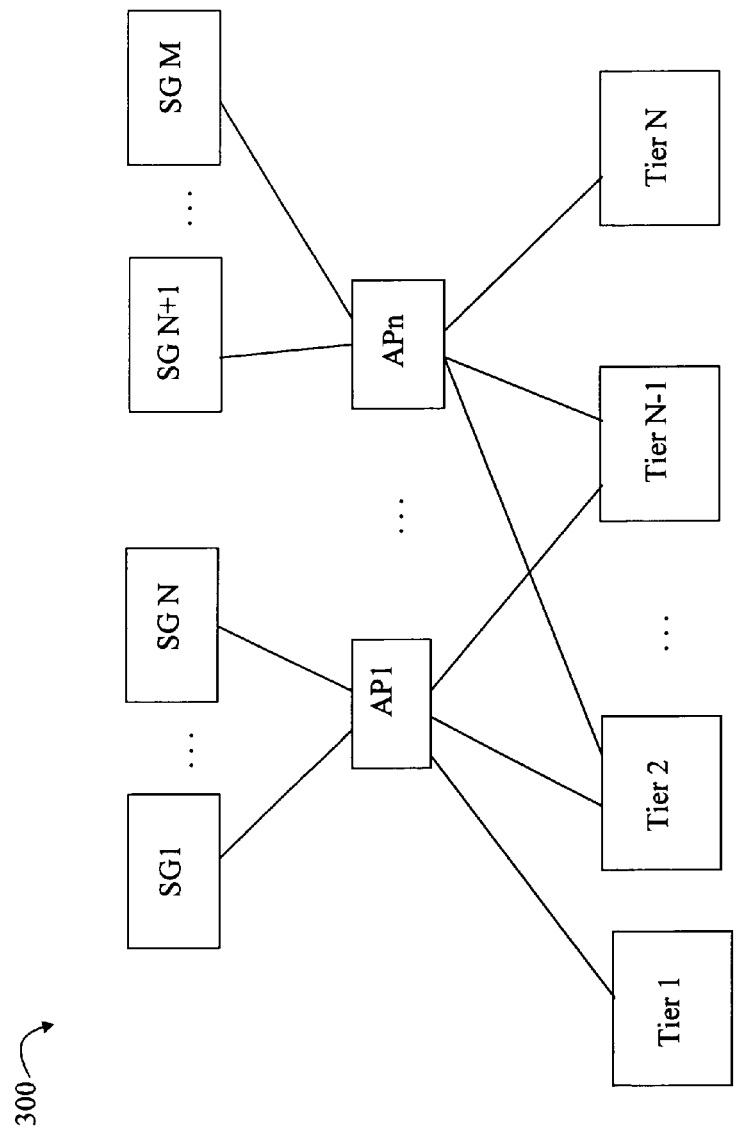

Referring to FIG. 7, shown is an example which more generally illustrates different associations between SGs, APs and tiers in an embodiment in accordance with techniques herein. The example 300 illustrates that an embodiment may have multiple storage tiers (e.g., tiers 1-N), multiple APs (e.g, AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum threshold or capacity as described in connection with FIG. 6. Each AP may be associated with one or more SGs. For example SGs 1-N may be associated with a same AP1, and SGs N+1 through M may be associated with a same APn.

Figure 8:
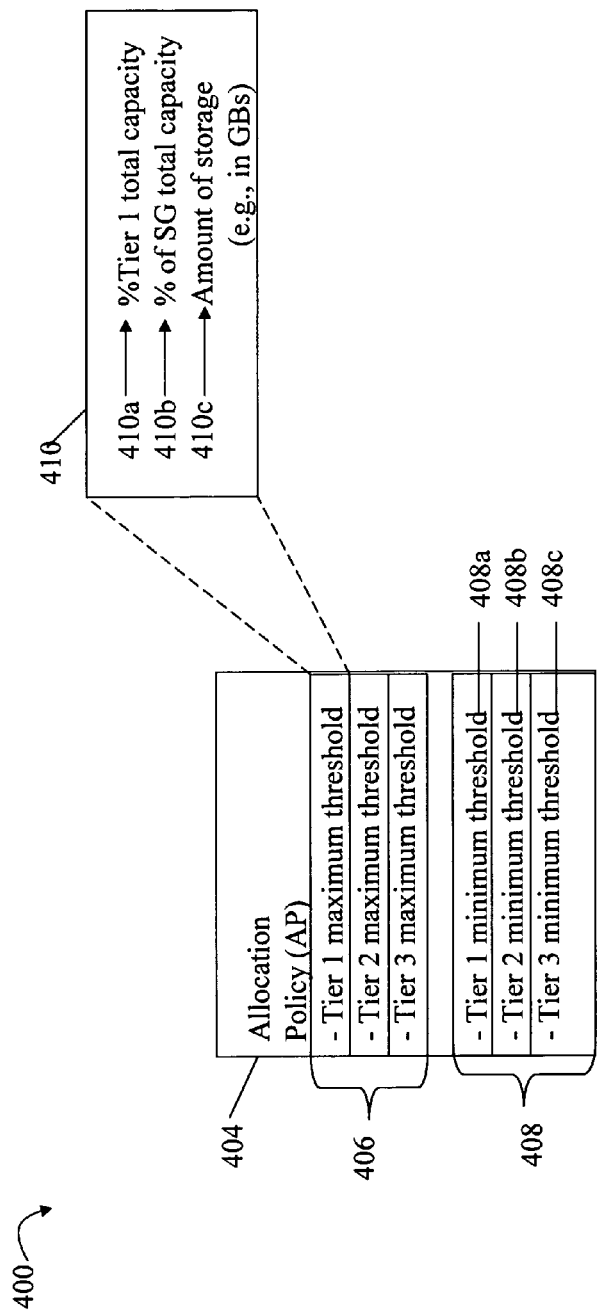
FIG. 8 is an example illustrating an allocation policy in more detail in an embodiment in accordance with techniques herein.

Referring to FIG. 8, shown is an example illustrating in more detail information that may be included in an AP in accordance with techniques herein. The AP 404 may include maximum thresholds 406 for the associated tiers as described above. Additionally, an embodiment may also include minimum thresholds 408 for the associated tiers. The minimum thresholds 406 may specify a lower bound or minimum amount of storage of associated tiers that may be allocated for use by an associated SG at a point in time. Thus, an embodiment in which an AP uses both thresholds 406 and 408 may partition the storage of the tiers subject to both sets of thresholds. For example, an SG associated with AP 404 may be allocated an amount of tier1 physical storage between the tier 1 maximum threshold and the tier 1 minimum threshold, inclusively. The minimum and maximum threshold for a tier may indicate a range of different candidate storage capacities that may be selected in accordance with techniques herein.

Each of the thresholds of 406, 408 may have any one of a variety of different forms. Element 410 represents some of the ways in which each such threshold may be expressed. For example, each maximum or minimum threshold of an AP may be expressed as a percentage or portion of tier total storage capacity 410a. as a percentage or portion of the SG total capacity 410b (e.g. as a percentage based on the total storage capacity consumed or used by the application), or as an integer indicating an amount or quantity of storage 410c (e.g., indicating a number of bytes or other number of storage units).

It should be noted that if tier maximum thresholds are represented relative to SG total capacity as in 410b, the sum of the percentages for all the associated tiers should be 100% or more. The sum of the maximum thresholds having form 410b may be more than 100% in order to allow for further flexibility in partitioning the multiple storage tiers as illustrated in following paragraphs. If tier maximum thresholds are represented relative to tier total capacity as in 410a or as an absolute amount as in 410c, the total or sum of maximum thresholds across all tiers of an SG should be at least that amount which is actually consumed by the SG. Thus, as storage consumed by the SG or application increases, so may the percentages of 410a and/or amounts of 410c for a given AP. To further illustrate, an SG may include LV1 which is 10 GB (gigabytes) and LV2 which is 90 GB. If tier 1 maximum threshold=50% and such threshold is with respect to the SG total capacity (e.g., 410b), then the maximum threshold for tier 1 storage for the SG is 50 GBs (50% of 10 GB+90Bs) and a partitioning of the storage tiers may be made so long as no more than 50 GB of tier1 storage is used for storing data of SG1. If tier 1 maximum threshold=50% and such threshold is with respect to the tier 1 total capacity, assuming tier 1 has a storage capacity of 300 GBs, then the maximum threshold for tier 1 storage for the SG is 150 GBs (50% of 300 GBs) and a partitioning of the storage tiers may be made so long as no more than 150 GB of tier1 storage is used for storing data of SG1. If minimum thresholds are specified for a tier, the total capacity of the tier should be at least that as represented by the sum of the minimum thresholds for that tier across all SGs.

It should be noted that the thresholds of 406, 408 may be determined in a variety of different ways such as, for example, manually by a user, automatically selected using software, and the like.

Figure 9:
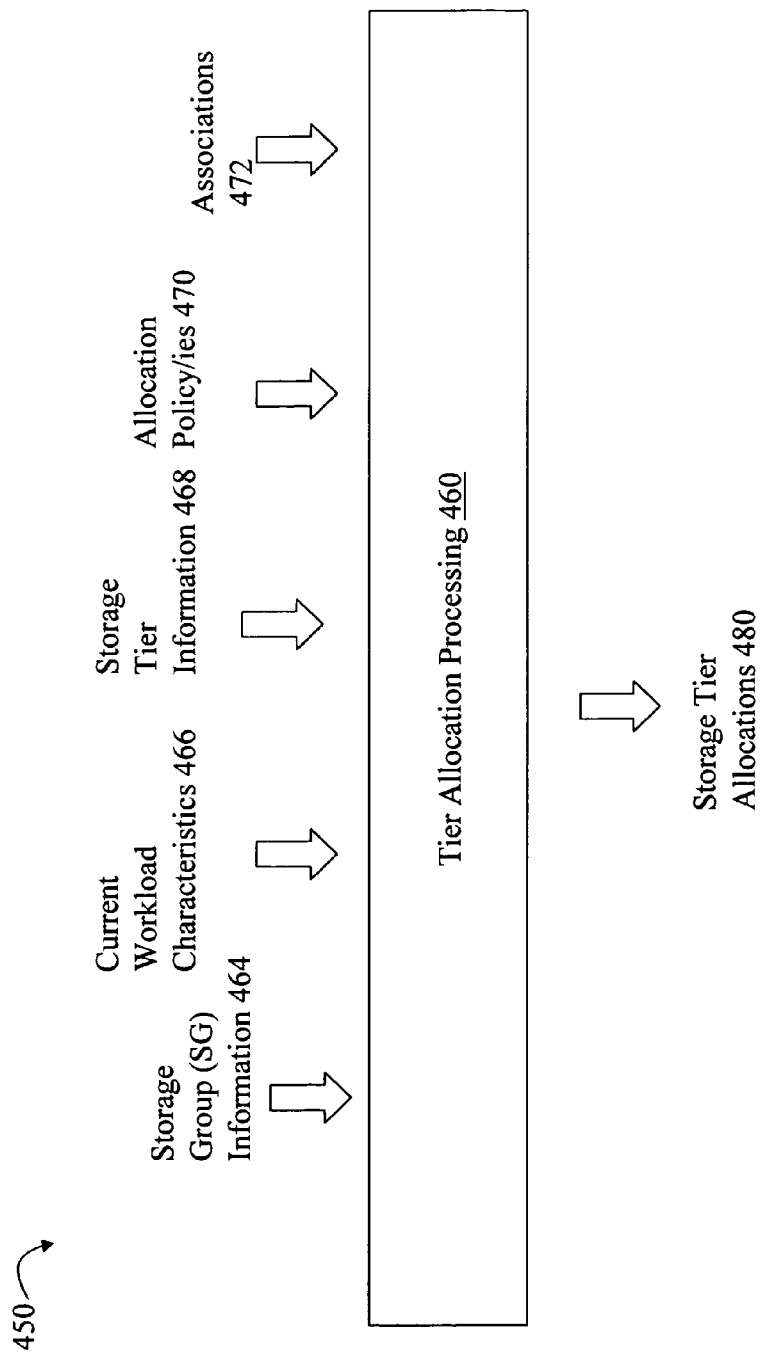
FIG. 9 is an example illustrating inputs and outputs of tier allocation processing in an embodiment in accordance with techniques herein.

Referring to FIG. 9, shown is an example representing the different inputs that may be used in an embodiment in partitioning the multiple storage tiers for use by the different applications in accordance with techniques herein. The example 450 includes a tier allocation processing module or component 460 that may take as inputs SG information 464, current workload characteristics 466, storage tier information 468, allocation policies 470 and associations 472 (e.g., between different APs and SGs, APs and tiers). As an output, module 460 may produce storage tier allocations 480 for each SG of 464.

Element 464 may represent information of the one or more SGs for which partitioning of 460 is performed. The SG information 464 may include, for each of 464, an SG priority and which LVs or other logical devices are included in the SG. Element 466 may include information indicating the current workload of each SG (e.g., each LV of the selected SGs 464).

As described elsewhere herein, the current workload may be based on actual observed performance data analyzed to determine how busy the different LVs and/or SGs are. For example, such information of 466 may include an average number of I/O operations/unit of time (e.g., I/O throughput), latency time, response time, service time, and the like. Element 468 may include a total storage capacity of each storage tier. Element 470 may include AP information such as the maximum and/or minimum thresholds for each tier of the AP. Element 472 may include an indication of what AP is associated with what one or more SGs and what AP is associated with what one or more tiers. Element 480 may have any one of a variety of different forms and formats. For example, element 480 may generally be expressed in any one of the forms of the thresholds as in 410 of FIG. 8. For example, element 408 may indicate, for each SG of 464 and each storage tier, an absolute amount of storage, a percentage relative to each tier's storage capacity, or a percentage relative to the total SG storage capacity.

It should be noted that devices included in the SGs of 464 may be candidates to move between different storage tiers based on the AP associated with each SG. For example, the output 480 may be used by the optimizer to generate one or more possible ways in which the storage tiers may be allocated for use by the SGs. Additionally, for each such way in which the tiers may be partitioned, the optimizer may consider one or more possible plans for location of LV data so that one or more LVs of the SGs may have their data relocated or moved between tiers. Additionally, different techniques for optimization may be performed within each storage tier.

Figure 10:
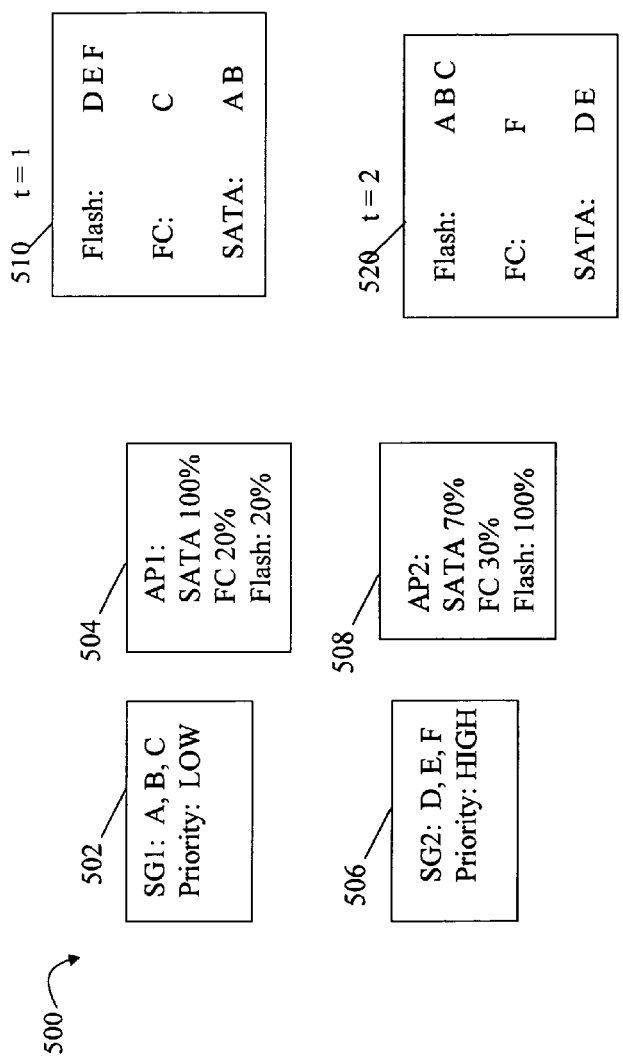
FIG. 10 is an example illustrating use of allocation policies in an embodiment.

Referring to FIG. 10, shown is an example illustrating use of the techniques herein. In the example 500, there may be 3 storage tiers (e.g., tier 1=flash, tier 2=FC, tier 3=SATA) as described in FIG. 6. Each SG may have one of the following 3 priorities in increasing order: LOW, MEDIUM, HIGH. There may a first SG 502 of LVs A, B and C with a priority of LOW, and a second SG 506 of LVs D, E and F with a HIGH priority. A first AP1 504 is associated with SG 1 502 and indicates the following maximum thresholds as percentages of SG storage capacity for each tier: SATA 100%, FC 20% and Flash 20%. Element 504 includes percentages of more than 100% to allow the optimizer flexibility in storage tier allocation. For example, the AP 1 504 indicates that SG1 may have all of its data (100%) stored on SATA drives of tier 3. However, if additional storage in tier 1 and/or tier 2 is available (e.g., such as not in use by another SG's data having a higher workload than SG1), then locate up to 20% of SG1's data in each of tier 1 and tier 2. Thus, the optimizer has flexibility in partitioning the storage tiers and may consider options where the data of SG1 is placed on tier 1 and/or tier 2 storage without requiring reserving a fixed amount of tier 1 and/or tier 2 storage capacity for use by SG1. The optimizer may consider storage tier partitioning solutions where all SG1's data is located on SATA, as well as other possible partitioning solutions where up to 20% of SG1's data is located in each of tier 1 and/or tier 2. In other words, AP1 504 may be characterized as specifying a range of possible partitioning solutions including a first having a minimum performance level characteristic where all SG 1 data is located in SATA to a second having a maximum performance level characteristic where 20% of SG1 is located on flash, 20% of SG1 is located on FC devices, and 60% is located on SATA devices. A second AP2 508 is associated with SG 2 506 and indicates the following maximum thresholds as percentages of SG storage capacity for each tier: SATA 70%, FC 30% and Flash 100%. Element 508 includes percentages of more than 100% to allow the optimizer flexibility in storage tier allocation. For example, the AP2 508 indicates that SG2 may have 70% of its data stored on SATA drives of tier 3 and 30% of its data on tier2 FC drives. However, if additional storage in tier 1 is available (e.g., such as not in use by another SG's data having a higher workload than SG1), then locate up to 100% of SG2's data in tier 1 flash. Thus, the optimizer has flexibility in partitioning the storage tiers and may consider options where the data of SG2 is placed on tier 1 storage without requiring reserving a fixed amount of tier 1 storage capacity for use by SG2. The optimizer may consider storage tier partitioning solutions where 70% of SG1's data is located on SATA and 30% on FC, as well as other possible partitioning solutions where up to 100% of SG1's data is located in tier 1. In other words, AP2 508 may be characterized as specifying a range of possible partitioning solutions including a first having a minimum performance level characteristic (e.g., such as based on expected performance given the characteristics associated with each tier) where 70% of SG 1 data is located in SATA and 30% on FC to a second having a maximum performance level characteristic where 100% of SG1 is located on flash. As described elsewhere herein in more detail, the partitioning solution selected may vary with different criteria evaluated at a point in time such as with the relative workloads of devices of SG1, SG2 and others, different SG priorities, and the like. In connection with the foregoing, the optimizer may determine a performance level characteristic for a possible partitioning solution by determining an expected performance for a SG given the performance characteristics (e.g., latency time, I/O throughput capabilities and the like) associated with the drives of each tier.

To further illustrate, assume the system includes only SG1 and SG2 of the example 500. At time t=1, let the workload of SG1 be determined as substantially the same as the workload of SG2. The system may use current workload and the priority associated with each of SG1 and SG2 to determine storage tier partitioning. Since the current workload of both are about the same (e.g., within some specified limit or threshold), each SG's priority may be used as a deciding factor in storage tier partitioning. In this case, SG2 has a HIGH priority and SG1 has a LOW priority. Storage may be partitioned as illustrated in 510 where all of SG2's data (e.g, LVs D, E and F) is located all in flash and all of SG1's data (e.g., LVs A, B and C) is located in FC and SATA. SG2 has its data located on storage tier devices in accordance with a maximum performance characteristic possible given AP1 504 where all SG2 data is located in flash. SG1 may have its data location in the different storage tiers determined after satisfying SG2's placement. In this example, there may be no further available flash storage capacity after placement of SG2 in flash. However, there is a sufficient storage capacity in FC to hold the maximum of 20% of SG2 (as indicated in AP 1 504) with the remainder of SG2 located in SATA.

At a later point in time, t=2, assume SG2's devices (e.g., LVs A, B and C) become idle and SG1's devices (e.g., LVs D, E, and F) are very busy having a high workload with high I/O activity relative to SG2. Further, assume that AP1 504 is updated to as follows: SATA 100%, FC 100%, Flash 100%. In this case, storage may be partitioned as illustrated in 520 where all of SG1's data is located all in flash and all of SG2's data is located in FC and SATA due to the relative workload differences. The optimizer has the flexibility to relocate data of SG1 to the highest performance storage tier of flash when not needed for SG2. The techniques herein provide flexibility so that when a first SG is busier than a second, the system has the ability to allocate more of a higher performance storage tier for the first SG's data. When the first SG's workload decreases, then the system may move the first SGs data to another storage tier in accordance with the maximum threshold percentages of the AP associated with the first SG. Overall, the techniques herein provide for defining an AP with flexibility in allocation by specifying percentages which total more than 100% of an SG's actual capacity. In such a case, there is flexibility in storage tier partitioning and allocation for the SG. If the AP allows for a particular partitioning that the optimizer determines is beneficial to the SG and/or overall data storage system performance, the partitioning may be selected and may also result in movement of the SG's data to a higher tier. Whether to select a particular storage allocation or partitioning may be determined by performing a cost-benefit analysis including any costs associated with data movement between tiers, benefit to the individual SGs and overall data storage system performance.

In connection with the techniques herein, an application's data may be defined as an SG associated with an AP. The AP may define in percentages what is the capacity upper limit or maximum threshold the application can use from each tier. The total of the foregoing percentages across all tiers can be more than the storage capacity of the application. Using the maximum thresholds for the storage tiers instead of fixed allocations alleviates a need for accurately specifying storage allocations for the tiers such as for expensive high performance flash drives. The techniques herein with the flexible maximum thresholds allow the system a variety of optimization options based on workload and other criteria while not requiring reservation of storage for an application whether the application is able to efficiently use such storage or not.

Additionally, the techniques herein allow for a variety of different criteria including priority to be used in connection with determining how to allocate or partition storage from the different tiers for use by multiple applications. For example, if a decision of how to partition storage is based only on workload so that the "busiest" devices having the highest I/O activity are placed on the highest performing tiers, a single application's data may consume an entire uppermost storage tier, such as all of a flash tier. This may be undesirable, for example, where the single application may not be as important to the user as other applications. In this case, an application's priority may be used as a factor when deciding how to partition storage of the multiple tiers. For example, reference is made back to FIG. 10 where SG1 502 may correspond to the data of a backup application with a LOW priority and its devices at time t=2 may be the busiest in the system. However, a database application (having its data correspond to SG2 506) may have a HIGH priority. Due the HIGH priority of SG2, a decision may be made to place at least some of the data from SG2 on flash despite SG1 having the devices with the higher workload. It should be noted that a minimum threshold may also be used to specify a lower bound on the capacity for a given tier to ensure that a minimum amount of the database application's data is located on flash. For example, element 508 may include a lower threshold for the flash tier so that at least this minimum amount of storage is allocated for use by SG2.

Use of the flexible maximum thresholds allows for partitioning tiers among the various applications where the optimizer can automatically make partitioning decisions based on an evaluation of what is most beneficial for a set of criteria. Generally, for a tier, an amount allocated for an SG or application may be represented as a function of one or more criteria including maximum thresholds from an AP, minimum thresholds from an AP, current workload, priority, and also other criteria. An embodiment may also include a time factor or criteria when evaluating different storage tier partitioning possibilities. For example, the criteria may include an indicator which weights one or more other factors depending on the time of day, week, month, and the like, analysis is performed to partition storage. To further illustrate, if an application is busy at a particular time of the month or year (e.g., such as a tax or financial application during the few weeks prior to tax or other filing deadlines), a weighting factor may be added to increase the amount of storage allocated for the highest performing tier (e.g., flash). For example, the maximum threshold specified for the flash tier1 may be multiplied by a value greater than 1 based on the application's priority.

An embodiment may evaluate the criteria described herein with a different level of importance or weight given to each that may vary with embodiment and the particular usage of each criteria. For example, an embodiment may give greater importance or weight to application priority over workload, may use priority to weight one or more other criteria, and the like.

Figure 11:
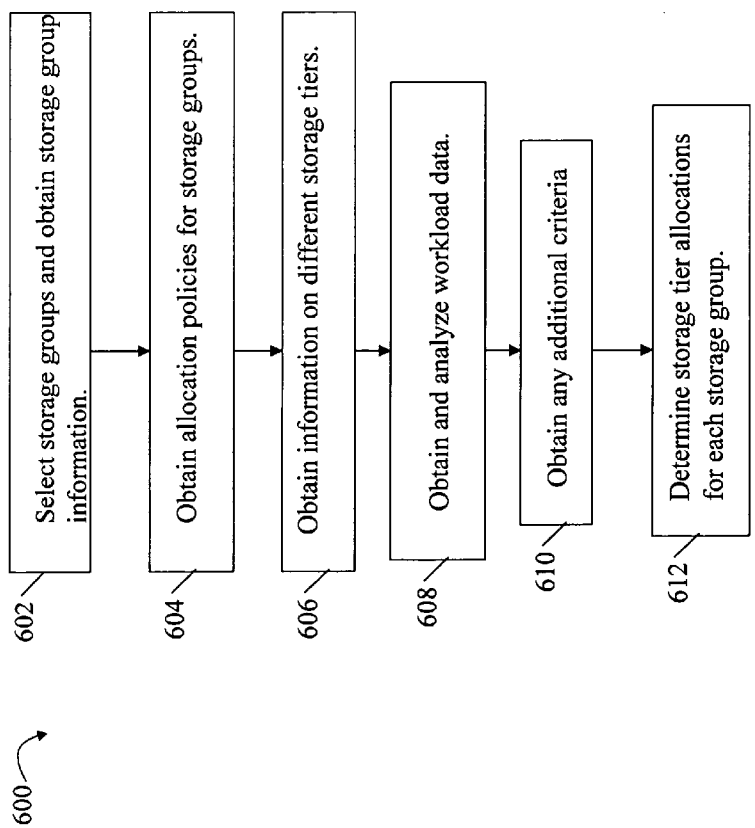
FIG. 11 is a flowchart of processing steps that may be performed in an embodiment to determine storage group allocations in accordance with allocation policies and other criteria.

Referring to FIG. 11, shown is a flowchart of processing steps that may be performed in an embodiment in accordance with techniques herein. The flowchart 600 summarizes processing described above. At step 602, the SGs for which partitioning is performed are selected. Additionally, information about the selected SGs is obtained as may be included in SG definitions. Such SG information may include, for example, a priority for each SG and which devices such as LVs are included in each SG. At step 604, one or more APs associated with the selected SGs are obtained. Each AP includes one or more thresholds as described above. At step 606, information on the different storage tiers associated with the APs and SGs is obtained. Storage tier information may include total capacity for each tier as well as other information that may be used in subsequent processing. At step 608, workload data for the selected SGs is obtained and analyzed. As described herein, the workload data may be generally any one or more measurements used to characterize the current I/O rates or level of how busy the devices of the SGs are. At step 610, any additional criteria used in performing the storage tier partitioning or allocated is obtained. At step 612, storage tier allocations are determined for each storage group. Step 612 may include an optimizer evaluating the particular criteria including the APs, workloads, and the like, as described herein.

The steps of flowchart 600 may be performed initially and then repeated periodically to re-evaluate a current partitioning. The method may be performed, for example, in response to an occurrence of a selected event, user initiated action, and the like.

Data used in connection with techniques herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each LV. For example, for each LV, an average number of reads occurring within a given time period may be determined, an average number of writes occurring within a given time period may be determined, an average number of read misses occurring within a given time period may be determined, and the like. It should be noted that the operations of read and write with respect to an LV may be viewed as read and write requests or commands from the DA, controller or other backend physical device interface. Thus, these are operations may also be characterized as a average number of operations with respect to the physical storage device (e.g., average number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

An embodiment in accordance with techniques herein may provide for automated evaluation to partition or allocate physical devices of particular storage tiers in a multi-tier storage environment among a plurality of applications. The techniques may make such determinations in accordance with criteria included in a storage allocation policy. Additionally, other criteria may be used in combination with the storage allocation policy to perform this partitioning. Such criteria may also include any one or more of a priority, one or more performance metrics, and the like. An embodiment in accordance with the techniques herein may also provide for automated movement of data across or between different storage tiers as may be needed based on changing workload. Additionally, once a tier is determined, other techniques may be used to determine which particular data of the application (e.g., which one or more LVs in a storage group) to store on physical devices of a particular tier. Furthermore, an embodiment may also use other techniques for load balancing among different physical storage devices in the same tier.

As mentioned above, an embodiment may be use the techniques described herein alone or in combination with other techniques. For example, an embodiment may use the techniques described herein alone, or in combination with a technique to evaluate which device's data should reside on physical storage of different tiers based on performance goals. For example, an embodiment may use the techniques herein in combination with the techniques described in U.S. patent application Ser. No. 12/803,571, filed on Jun. 30, 2010, TECHNIQUES FOR AUTOMATED EVALUATION AND MOVEMENT OF DATA BETWEEN STORAGE TIERS, which is incorporated by reference herein, for performing a determination based on performance goals in evaluating whether to locate data in a flash or non-flash-based storage tier.

In an embodiment, the techniques described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs. An embodiment may also use techniques described in U.S. patent application Ser. No. 12/798,097, filed Mar. 30, 2010, ANALYSIS TOOL FOR A MULTI-TIER STORAGE ENVIRONMENT, which is incorporated by reference herein.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device is built of chunks having a size that may vary with embodiment. For example, in one embodiment, a chunk may correspond to a group of 12 tracks. As also noted with a thin device, the different chunks may reside on different data devices in one or more storage tiers. In one embodiment, as will be described below, a storage tier may consist of one or more storage pools. Each storage pool may include multiple LVs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool.

A thin device may contain thousands and even hundreds of thousands of such chunks. As such, tracking current allocations in the different storage tiers across all such chunks for a storage group of thin devices can be cumbersome and consume an excessive amount of resources. Additionally, it can consume an unacceptable amount of system resources to determine whether there has been any violation of capacity or allocation restrictions as may be specified in an allocation policy and, if so, to determine what chunks are candidates for relocation in order to correct any such violations. As also described above, an allocation policy may specify such capacity or allocation restrictions using thresholds. Such thresholds may include a maximum threshold or upper bound that is a limit on the amount of storage that may be allocated for use by a storage group. Such an upper bound or maximum threshold may be specified for each storage tier from which storage may be allocated for use by the storage group. Described in following paragraphs are techniques that may be used in connection with thin devices to enforce capacity or allocation restrictions as may be included in an allocation policy for a storage group of thin devices. In connection with examples in following paragraphs, details such as specifying thresholds using one type of percentage, having a single storage pool in each storage tier, and the like, are provided for purposes of illustration. Those of ordinary skill in the art will readily appreciate the more general applicability of techniques herein in other embodiments such as, for example, having a storage group include a plurality of storage pools, applying the techniques herein to enforce capacity restrictions having a lower bound or threshold, and the like.

The techniques herein provide for efficiently evaluating whether there are any capacity or limit restriction violations. Furthermore, the techniques herein may also be used to identify which chunks to move between pools to reduce or otherwise alleviate any such violations of capacity limits or restrictions without a need to monitor data movement in order to achieve desired capacity limits and restrictions.

Figure 12:
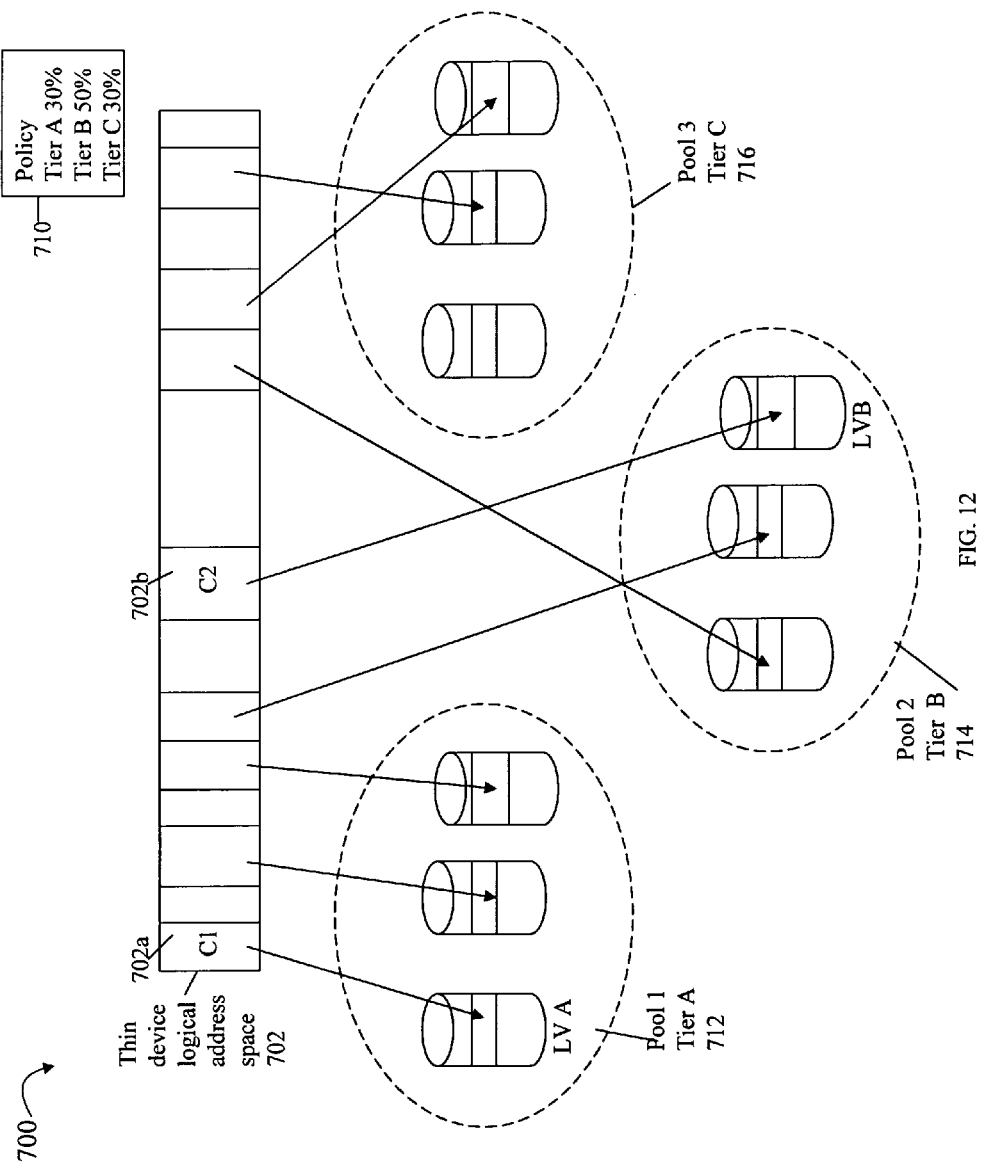
FIG. 12 is an example illustrating use of techniques herein with a thin device in an embodiment.

Referring to FIG. 12, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices. Element 710 may represent information of an allocation policy and denote maximum thresholds in terms of percentages of all tier storage that may be used for the storage group including the first thin device.

In connection with techniques herein, counters may be maintained for each storage group and for each thin device in the storage group. The counters may include a counter for each pool of a storage tier. It should be noted that in an embodiment having only a single storage pool per storage tier, the counter maintained for each storage pool may also represent a counter for the storage tier. However, in an embodiment having multiple storage pools per tier, a separate counter may be maintained at the storage group level and thin device level for each such pool. Additionally, an allocation map may be used to identify the mapping for each thin device chunk (e.g. where each chunk is physically located).

Figure 13A:
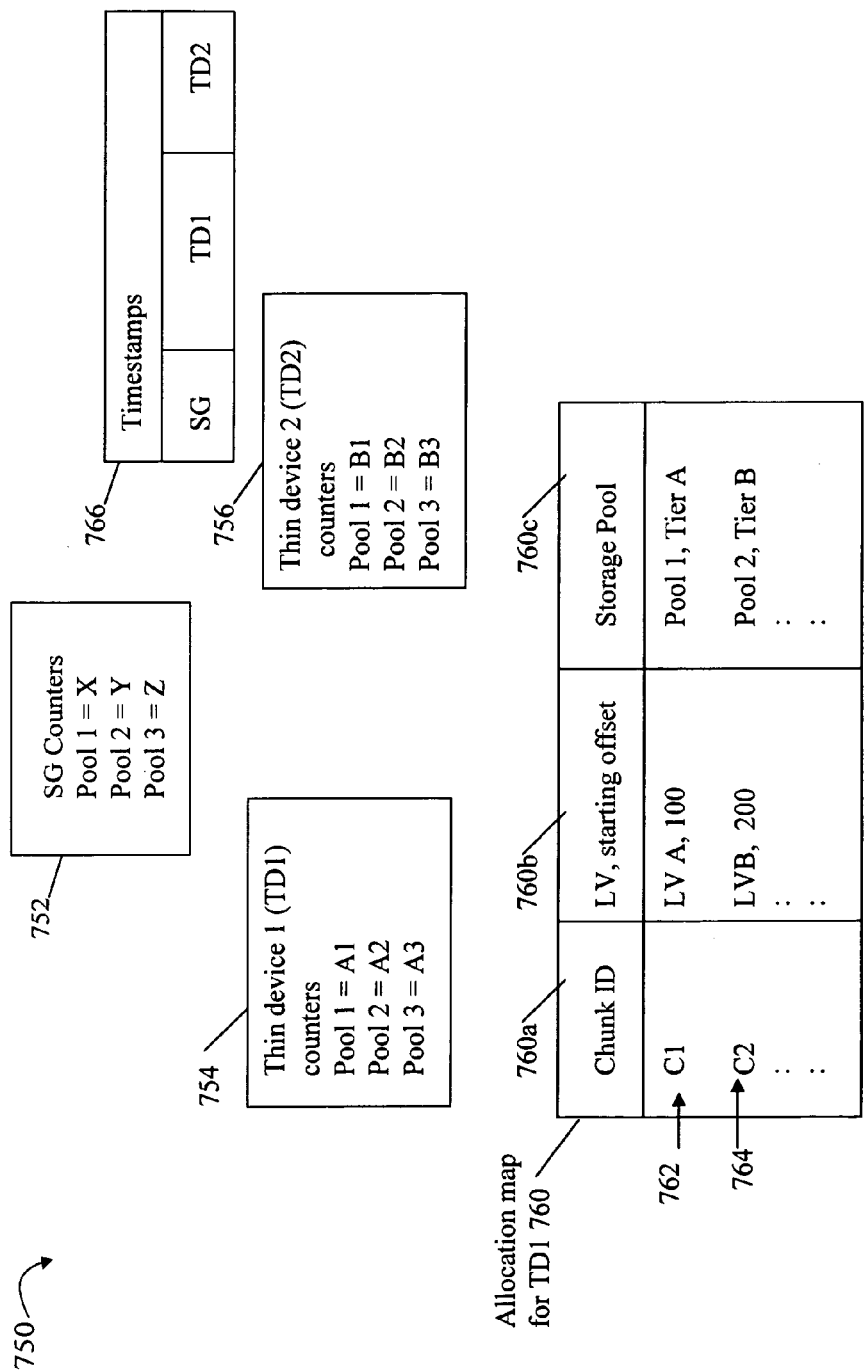
FIGS. 13A and 13B illustrate information related to storage groups and thin devices that may be used in connection with techniques herein.

Referring to FIG. 13A, shown is an example of information that may be maintained and used in an embodiment in connection with techniques herein. The example 750 includes storage group (SG) counters 752, thin device (TD) counters 754 and 756, timestamps 766 and allocation map 760. The example 750 illustrates information that may be used in connection with an SG including two thin devices—thin device 1 (TD 1) and thin device 2 (TD2) having an allocation policy as specified in 710 of FIG. 12. Continuing with the example of FIG. 12, there are three storage pools—pool 1, pool 2 and pool 3. Element 752 illustrates SG counters maintained for the three storage pools. Element 754 illustrates thin device level counters maintained for the three storage pools for TD 1. Element 756 illustrates thin device level counters maintained for the three storage pools for TD2. Each of the counters may be an integer quantity representing a number of chunks or other units of storage allocated for use from each of the different storage pools. The SG counters 752 represent such counters for the entire storage group. Each set of TD counters 754, 756 represents such counters for each respective thin device. Thus, the SG counters 752 provide a broader view of the storage allocated for the entire storage group. If there is a capacity violation for any storage tier in the storage group, counters of 752 may be used to make such an initial determination. Further, if such a capacity violation is detected using the SG counters 752, the counters maintained for each TD 754, 756 may be used to further identify which TD has storage allocated from the storage tier and associated pools in violation of the allocation or capacity limits of the allocation policy. It should be noted that an embodiment may store information regarding each storage tier including information which identifies the one or more storage pools included in the storage tier.

Element 760 represents an allocation map that may be maintained for each TD. In this example, element 760 represents information as may be maintained for a single TD, such as TD1, although another allocation map may be similarly used and maintained for each other TD, such as TD2, in the storage group. Element 760 may represent mapping information as illustrated in FIG. 12 such as in connection with the mapping of 702 to different storage pool devices. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, a second column 760b, indicates information about the LV and offset to which the chunk is mapped, and a third column storage pool 760c denotes the storage pool and tier including the LV of 760b. For example, entry 762 represents chunk C1 illustrated in FIG. 12 as 702a and entry 764 represents chunk C2 illustrated in FIG. 12 as 702b. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 5B.

Such information as illustrated and described in connection with FIG. 13A may be maintained for each SG and thin devices thereof in an embodiment in accordance with techniques herein.

Figure 13B:
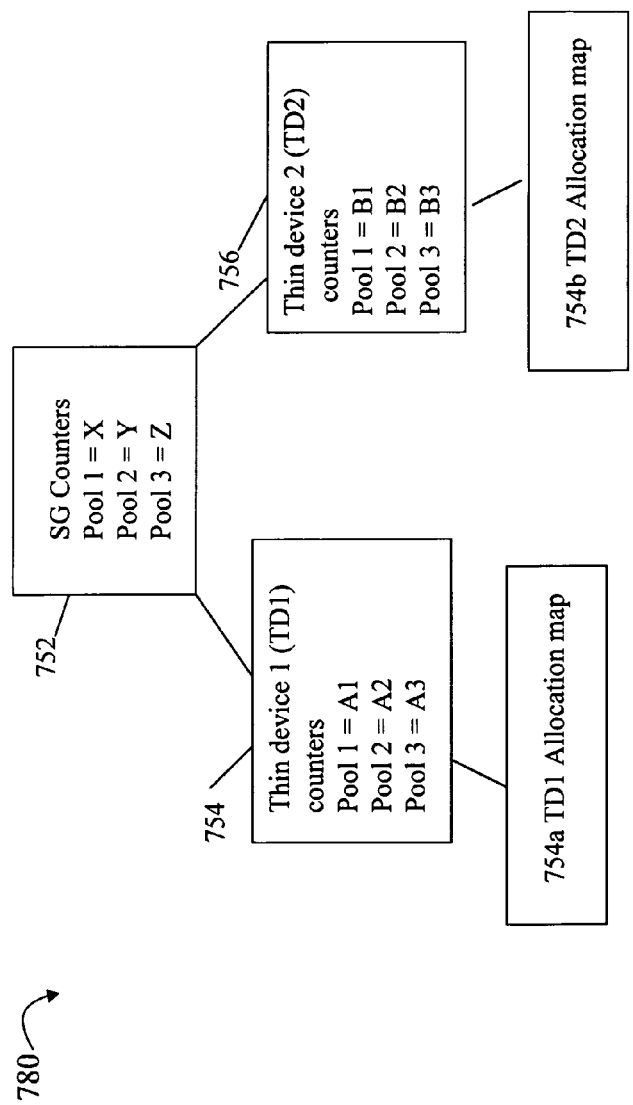

The elements 752, 754 and 756 and allocation map for each thin device may be characterized as forming a hierarchy of information. FIG. 13B further illustrates this hierarchical representation. As described in following paragraphs, processing may be performed using information associated with different levels of the hierarchical representation in connection with evaluating whether there are any capacity violations using information of 752 and, if so, identifying candidates for data movement. When identifying candidates for data movement, a first level of processing may use information of 754 and 756 to identify which thin devices have storage allocated from the storage pools of tiers having violations. For such thin devices, information of 754a and 754b may be used in a second level of processing to identify data movement candidates at the thin device level.

Referring back to FIG. 13A, when an SG is determined to have a capacity violation, timestamps 766 may be maintained for the SG and for each thin device (e.g., TD1 and TD2) in the SG. As will be described in connection with processing in the following paragraphs, each timestamp may indicate a time that the SG or TD was last used in connection with such processing. Timestamps may be used in connection with techniques herein to ensure an element of fairness or balance among the different SGs and, within each SG, the TDs thereof.

As storage is allocated or deallocated for an SG, an embodiment may accordingly update counters with each such allocation change. For example, counters 752, 754 and 756 may be updated as storage allocations vary in time for the illustrated SG and thin devices TD1 and TD2. If such counters are kept up to date and approximately reflect current storage allocations, this information will be readily available when needed to determine thin device capacity limit violations. The counters provide sufficiently accurate information at any point in time despite any discrepancies between counters at different levels that may exist. At a point in time there may be discrepancies between counters at different levels (e.g., SG counters may not represent the sums of all TD level counters for each storage tier or pool), for example, while in the process of transitioning or moving data of one thin device to another physical location. However, after completion of the move, or other operation, and the updating of the counters is also complete, the counters will accurately reflect any final allocation changes.

As an example illustrating use of techniques herein to identify capacity violations, consider an embodiment with four SGs and 3 tiers of storage. For each storage tier, there is a single pool such as illustrated in FIG. 12. Each SG may be associated with an allocation policy specifying capacity limits or thresholds for each storage tier. In the example, each allocation policy may specify a maximum threshold or upper bound for each storage tier as a percentage of total tier storage capacity. For example, 20% for flash storage tier indicates that at most 20% of all flash storage in the system may be used in connection with the associated SG. For each storage tier in each SG, an actual percentage of storage currently allocated for use by the SG is determined. For example, for each of the four SGs, three percentages are determined indicating an amount of storage from each storage tier currently allocated for use by the SG. The foregoing percentages for each SG may be determined using the SG counters. In this example, since each storage tier includes only a single pool, determining a percentage of storage of the single pool currently used or consumed corresponds to determining such a percentage with respect to the storage tier. To further illustrate, let SG1 have the following pool counters: pool 1=10 chunks, pool 2=20 chunks, pool 3=30 chunks, and that the pools have the following capacities: pool 1=100 tracks, pool 2=200 tracks and pool 3=300 tracks. For each pool in SG1, processing may be performed to determine an amount of storage in each pool, X, currently allocated to, or consumed by, the SG, "storage consumed in pool(X)". This may be represented as:

$$\text{Storage consumed in pool}(X) = SG \text{ pool counter}(X) \\ * \text{size of each chunk} \quad \text{EQUATION 1}$$

where SG pool counter (X) is the value of the SG level counter for pool X, and size of each chunk represents a size, such as a number of tracks, kilobytes, gigabytes, or other units of storage, corresponding to each chunk. The percentage of the pool X's total capacity consumed by the SG (e.g. % pool (X) consumed) may be represented by the following EQUATION 2:

$$\% \text{pool}(X)\text{consumed} = \text{Storage consumed in a pool}(X) / \\ \text{pool } X\text{'s total capacity}$$

wherein Storage consumed in a pool(X) may be determined using EQUATION 1 and pool X's total capacity represents the size of pool X, such as in terms of the same storage units as the size of each chunk.

In an embodiment having a single pool in each storage tier, a comparison may be made between the "% pool (X) consumed", as determined using EQUATION 2, to a corresponding threshold in an allocation policy associated with SG1 to determine whether SG1 has a capacity violation for this particular pool and also for the storage tier. Such calculations and comparisons may be performed with respect to each storage tier and one or more pools for that tier and the thresholds in the allocation policy. Thus, an initial determination of whether there are any capacity violations for an SG may be performed efficiently using the SG level counters, such as represented by element 752 of FIG. 13A. As will be appreciated by those of ordinary skill in the art, in an embodiment in which there are multiple storage pools in each tier, a determination of the storage consumed or allocated for the storage tier as represented be EQUATION 1 may be determined based on the sum of storage allocated or consumed across all pools of the storage tier rather than a single pool. Similarly, the percentage as represented by EQUATION 2 may be made with respect to all storage pools of each tier.

For an SG, if any one or more capacity violations are determined, an entry is created for the SG and the entry is placed on one of the capacity violation queues or lists for further processing. In an embodiment having multiple storage tiers, each SG may have one or more capacity violations.

Figure 14:
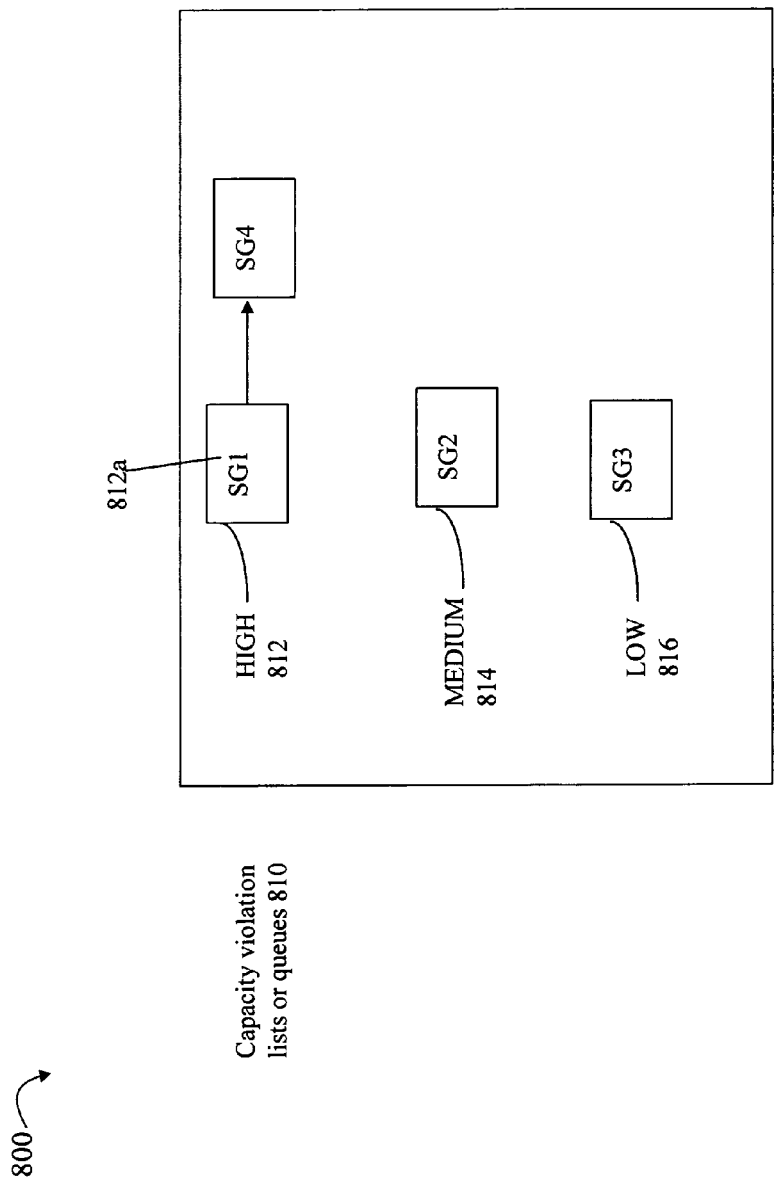
FIG. 14 is an example illustrating capacity violation queues that may be used in an embodiment in connection with techniques herein.

Referring to FIG. 14, shown is an example 800 illustrating capacity violation queues or lists 810 as may be used in an embodiment in connection with techniques herein. The example 800 includes a list or queue for each priority. As described above, for example, in FIG. 6, a priority may be specified for each storage group. If an SG is determined to have a capacity violation, an entry for the SG may be created and the entry may be placed on one of the queues of 810 associated with the SG's priority. In this example, there are 3 priority levels ad each of the four SGs—denoted SG1 through SG4—has been determined to have at least one capacity violation as may be determined using the SG level counters described above. A first list or queue 812 is associated with a HIGH priority level. SG1 and SG4 have HIGH priorities so corresponding entries for these SGs are placed on 812. A second list or queue 814 is associated with a MEDIUM priority level. SG2 has a MEDIUM priority so a corresponding entry is placed on 812. A third list or queue 816 is associated with a LOW priority level. SG3 has a LOW priority so a corresponding entry is placed on 816. Each entry in one of the capacity violation queues 810 is associated with a timestamp. Initially, the entry has a timestamp corresponding to the time at which the entry is placed in one of the queues. The entry's timestamp for the SG is updated in connection with subsequent processing performed for the SG.

Entries from the queues of 810 are selected for processing in order to identify data movement candidates to alleviate or reduce the existing capacity violations. Such capacity violation queue processing is described in more detail below.

A relative frequency may be associated with each queue of 810 indicating a weighted frequency with which an entry from each of the queues is processed. For example, an embodiment may associate a frequency of 3 with the high priority queue 812, a frequency of 2 with the medium priority queue 814 and a frequency of 1 with the low priority queue 816. The relative frequency for each queue may be determined as follows so that 3/6 selections for processing will select an entry from the high priority queue, 2/6 selections for processing will select an entry from the medium priority queue, and 1/6 selections for processing will select an entry from the low priority queue. An embodiment may track queue selections as needed in order to make subsequent selections based on the relative frequencies. Each such relative frequency may represent a weight indicating how many times one queue is selected relative to selecting any other queue. Each time an entry is selected for processing, the entry's time stamp may be updated to indicate the time at which the entry was most recently selected for processing. Furthermore, each of the lists or queues 812, 814 and 816 may be sorted based on SG timestamps associated with the queue entries so that, for each queue, the oldest entry in each queue is the next one selected from that queue for processing (e.g. within a given priority).

At various points in time, an entry may be selected from one of the capacity violation queues or lists for processing. The particular list or queue selected at each such point in time may be made with respect to the relative frequencies described above. Once a queue or list is selected, an entry for an SG within that queue may be selected for processing such as in accordance with the SG timestamps associated with entries of the queue. Continuing with the example from above, queue 812 may be selected for processing and, from queue 812, the entry 812a for SG1. Let SG1 include two thin devices—TD1, TD2—and let there be a capacity violation with respect to a single storage pool, pool 3. An embodiment may store information in the entry 812a for SG1 indicating the particular one or more pools and/or storage tiers for which a capacity violation has been determined using the SG level counters. The thin devices—TDs—in the SG may be determined using SG information as described above. For each TD, the TD level counters maintained for the different storage pools or tiers may be used. TD level counters are described elsewhere herein, for example, in connection with 754 and 756 of FIG. 13A. Using the TD level counters, a determination may be made as to which TDs of SG1 have storage allocated from pool 3 (e.g., the pool or tier having the capacity violation). A selection may be made from those TDs having storage allocated from pool 3 as represented by the pool 3 TD level counter being non-zero. In one embodiment, a timestamp may be associated with each TD of each SG having an entry in the queues or lists 810. Initially, all TD level timestamps may be set to indicate that the associated TDs have not been selected for processing. Each time a TD is selected for use in connection with capacity violation processing, the TD's timestamp is updated to indicate the time of the latest selection. An embodiment may select one of the TDs which has storage allocated from pool 3 and which also has the oldest timestamp (e.g., select the TD of the current SG being processed for which the most time has lapsed since last selected for processing).

Assume TD2 has storage allocated from pool 3, tier C, that we are 10,000 units over the maximum threshold for tier C storage (e.g., capacity violation of 10,000 units), and that TD2 has a counter for pool 3 indicating that TD2 uses 1,000 units of storage from pool 3 included in tier C. The allocation map for TD2 may be used to determine which chunks of TD2 are stored on pool 3 storage. In connection with processing herein and with reference back to FIG. 13A, the allocation map for TD2 may be represented by 760 and traversed to determine which chunks of the TD2 are located in pool 3. Each such chunk of TD2 located in pool 3 may be a candidate for data movement. During the traversal, information for each such chunk of TD2 located in pool 3 is recorded. In one embodiment, this information may include the thin device (TD) identifier (e.g., TD2), the chunk ID (e.g., C1 or C2 as denoted in 760), and a target pool. The TD identifier and chunk identifier may be determined using the allocation map for TD2. A target pool or tier may also be determined and identifies the pool of a storage tier to which the candidate's data is moved or relocated.

An embodiment may determine a target pool and associated tier using any one or more suitable techniques. For example, as a first option, an embodiment may randomly select one of the other pools of storage tiers that do not have an existing capacity violation and also where movement to the selected pool and associated tier will also not trigger a capacity violation. As a second option, an embodiment may select a target pool and associated tier based on characteristics associated with devices of that pool and tier. For example, performance characteristics for physical devices of pool 3, tier C may be compared to other performance characteristics for physical devices of pool 1, tier A and pool 2, tier B. A goal is to preferably not move data to a storage tier having lesser performance characteristics. For example, let pool 1, tier A include flash drives, pool 2, tier B include FC drives, and pool 3, tier C include SATA drives. An ordering of performance, from highest to lowest, may be pool 1/tier A, pool 2/tier B, pool 3/tier C. Based on the foregoing, an embodiment may look to move any chunks of TD2 from pool 3 to either of pool 1 or pool 2. In an embodiment having multiple storage pools within a same tier, processing may first try to select a target pool of a tier having a similar drive technology and performance characteristics as pool 3 (e.g., having the same or similar physical device performance characteristics such as maximum data throughput and I/Os/second). If such a pool is not available as the target pool, processing may try to select a target pool of a storage tier having better performance characteristics than pool 3. If such a pool is also not available, then processing may select a target pool of a storage tier having lesser performance characteristics than pool 3. As yet a third option, an embodiment may consider the current workload of the chunk or data portion being relocated. An embodiment may generally consider some measure/metric indicating the current workload or actual performance with respect to the chunk being moved when selecting the target pool. For example, a pool of a storage tier may be selected based on current workload or performance of the chunk relative to the performance characteristics of the different storage pools and associated storage tiers.

Continuing with the example, 1000 storage units of TD2 may be located using TD2's allocation map. Chunks corresponding to the 1000 storage units may be identified as data movement candidates and information may be recorded for these "data movement candidate" chunks as described above. An example representing a table or list of data movement candidates is described elsewhere herein in connection with FIG. 19. Still continuing with this example, although 1000 units have been identified, chunks for an additional 9,000 units need to be identified in accordance with the capacity violation of 10,000 units (e.g., 10,000 units over the maximum threshold indicated by the allocation policy). In other words, processing continues in a similar manner with traversing allocation maps for remaining TDs in order to identify chunks for the remaining 9,000 units. At the end of the traversal of one or more allocation maps for one or more TDs, data movement candidates are identified which, if successfully relocated or moved, result in removing the capacity violation of SG1 for pool 3.

It should be noted that the foregoing processing may be performed for each such storage tier having a capacity violation. When traversing an allocation map for a TD to determine data movement candidates to cure an existing capacity violation for a storage tier, traversal may stop when any one of several conditions occurs:

1. when the entire allocation map for the TD has been traversed;
2. when a sufficient number of data movement candidates have been determined to cure or correct the existing capacity violation (e.g., in connection with the above where there is a capacity violation of 10,000, when a sufficient number of data movement candidates have been determined to move 10,000 storage units from pool 3); or
3. when the TD level counter for the storage pool under consideration, such as pool 3, has been reached.

For a TD having an allocation map traversed in connection with processing described above, the last chunk or track examined in the map in connection with the traversal is marked. The next time capacity violation processing selects the TD for processing, processing resumes using a next chunk or track subsequent to the foregoing last chunk or track. In this case, tracks or chunks of the allocation maps may be traversed in a continuous round robin fashion.

Once a candidate list of chunks to be moved has been determined, an embodiment may actually perform the data movements indicated by the candidate list. An embodiment may queue the candidate list of chunks for movement at a later time, may commence processing for such movement immediately, may perform data movement as a background task, and the like.

An embodiment may also perform the foregoing processing of the capacity violation lists or queues in accordance with a budget. The budget may be represented in terms of a maximum amount of data that can be moved within a defined period of time. For example, an embodiment may use a budget of 10 GB or some other threshold indicating a maximum amount of data that can be moved at a single point in time or within a defined time period. This is to ensure that a limited amount of resources are used or consumed in connection with the techniques herein and that such techniques do not overburden a system through overconsumption. As described above, one of the capacity violation lists or queues may be selected. In one embodiment, the budget may be first partitioned equally among all SGs having entries in the selected queue. For each such SG having an SG budget, the SG budget may be further partitioned equally among all TDs in the SG. In an embodiment using budgets at the SG and TD level, processing of a TD may also terminate due to the TD budget being consumed. After completing processing for a selected SG in accordance with an SG budget, the SG may still have existing capacity violations. If so, the SG remains on the violation queue for further processing in accordance with a next selection. The completed processing for the SG may result in movement of data which lessens, but may not remove, an existing capacity violation.

Within a single list or queue that is selected, if a first SG does not consume its entire SG budget, any unused SG budget of the first SG may be distributed between remaining SGs on the selected queue or list. If there is an unused amount of the budget after processing all SGs on the selected list or queue, a second queue or list may be selected and the unused budget may be distributed among SGs on the second queue or list.

It should be noted that an embodiment may have an entire thin device, or portions, thereof which are designated as not moveable. For example, an application may require that a portion of its data be physically located in a particular physical location and not moved. An embodiment may also record which chunks designated as data movement candidates result in failure when the actual data movement is attempted. In this case, an embodiment may record or observe data movement failures and not subsequently and/or continually select the same candidates for movement.

As described above, within each capacity violation lists or queue, a timestamp is associated with each SG having an entry on one of the lists. For each SG, there may be a timestamp associated with each TD of the SG. For each TD, processing may record or mark the last chunk considered as a data movement candidate during processing. Using the foregoing, subsequent processing may resume within the SG with a next TD. The next time a TD is selected for processing, processing may resume from the point at which previous processing ended.

An embodiment in accordance with techniques herein may also use pool reserve capacity (PRC) values. A PRC specifies an amount of a storage pool which is not to be consumed in connection with data movement. Thus, when determining whether a data movement violates a capacity restriction, the PRC value may also be considered as another condition. In other words, the PRC value may be an additional condition or criteria used in connection with determining a target pool and storage tier. For example, when considering whether to move data D1 to a target pool, the thresholds or limits of the allocation policy are considered as well as the PRC value, where the PRC value specifies a minimum amount of storage that is to remain free or unused within a storage pool assuming that the storage pool is selected as the target pool.

In one embodiment, information such as of the various data structures illustrated in FIG. 13A may be stored in global memory of the data storage system. Processing, such as to determine whether there is a capacity violation and, if so, to identify data movement candidates, may be performed by executing code on a service processor, such as represented by 22a of FIG. 1, on a data storage system, and the like.

Figure 15:
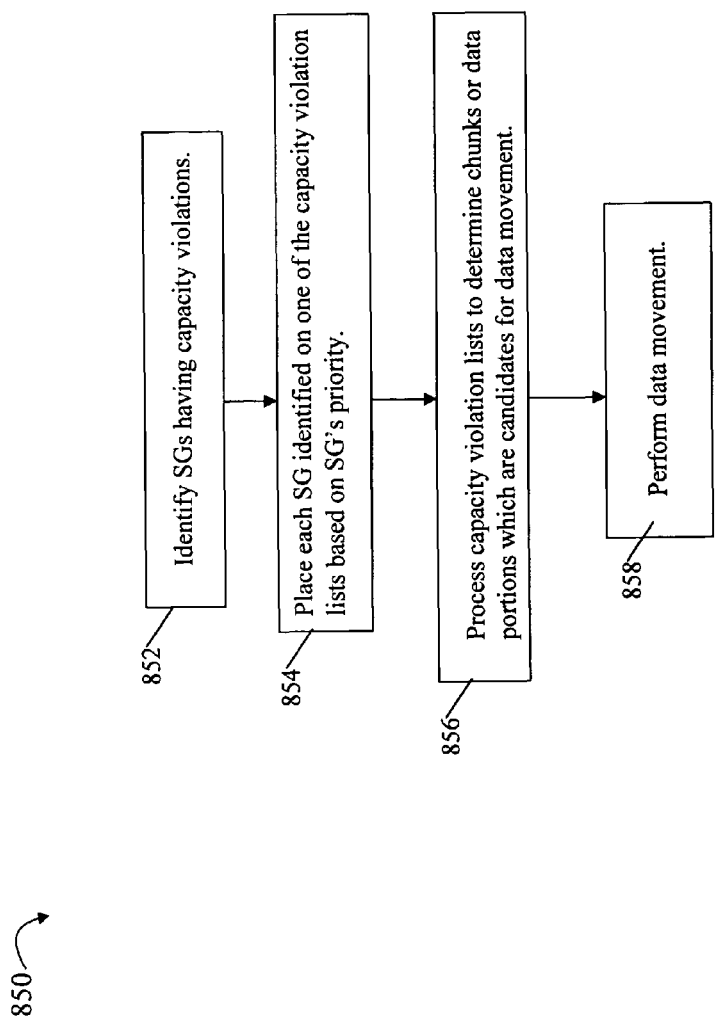
FIGS. 15, 16, 17 and 18 are flowcharts summarizing processing steps that may be performed in an embodiment in accordance with techniques herein.

Referring to FIGS. 15, 16, 17, and 18, shown are flowcharts of processing steps that may be performed in an embodiment in accordance with techniques herein. The flowcharts of FIGS. 15, 16, 17, and 18 summarize processing described above. Referring to FIG. 15, at step 852, SGs having capacity violations are identified. Step 852 may use SG level counters as described above. At step 854, each SG identified as having a capacity violation is placed on one of the capacity violation queues or lists based on a priority associated with each SG. Step 854 may also include recording an SG timestamp for each such entry. At step 856, processing of the capacity violation lists may be performed to determine chunks or portions of thin devices which are candidates for data movement. At step 858, data movement is performed for those candidates identified in step 856.

Figure 16:
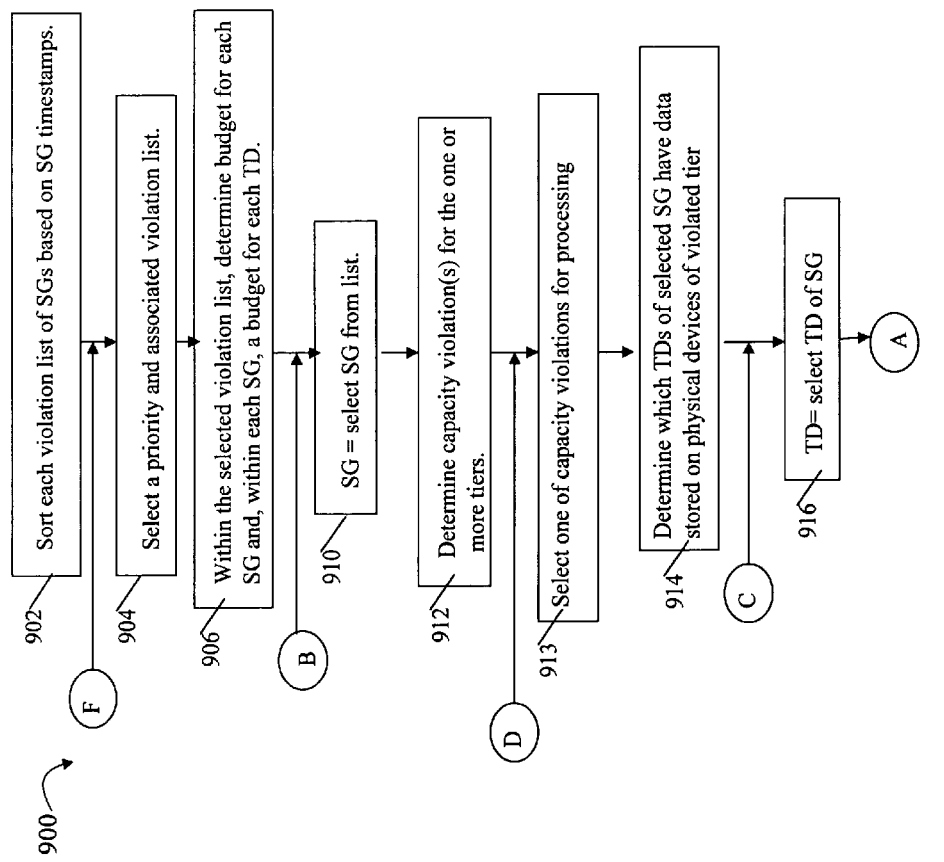
Figure 17:
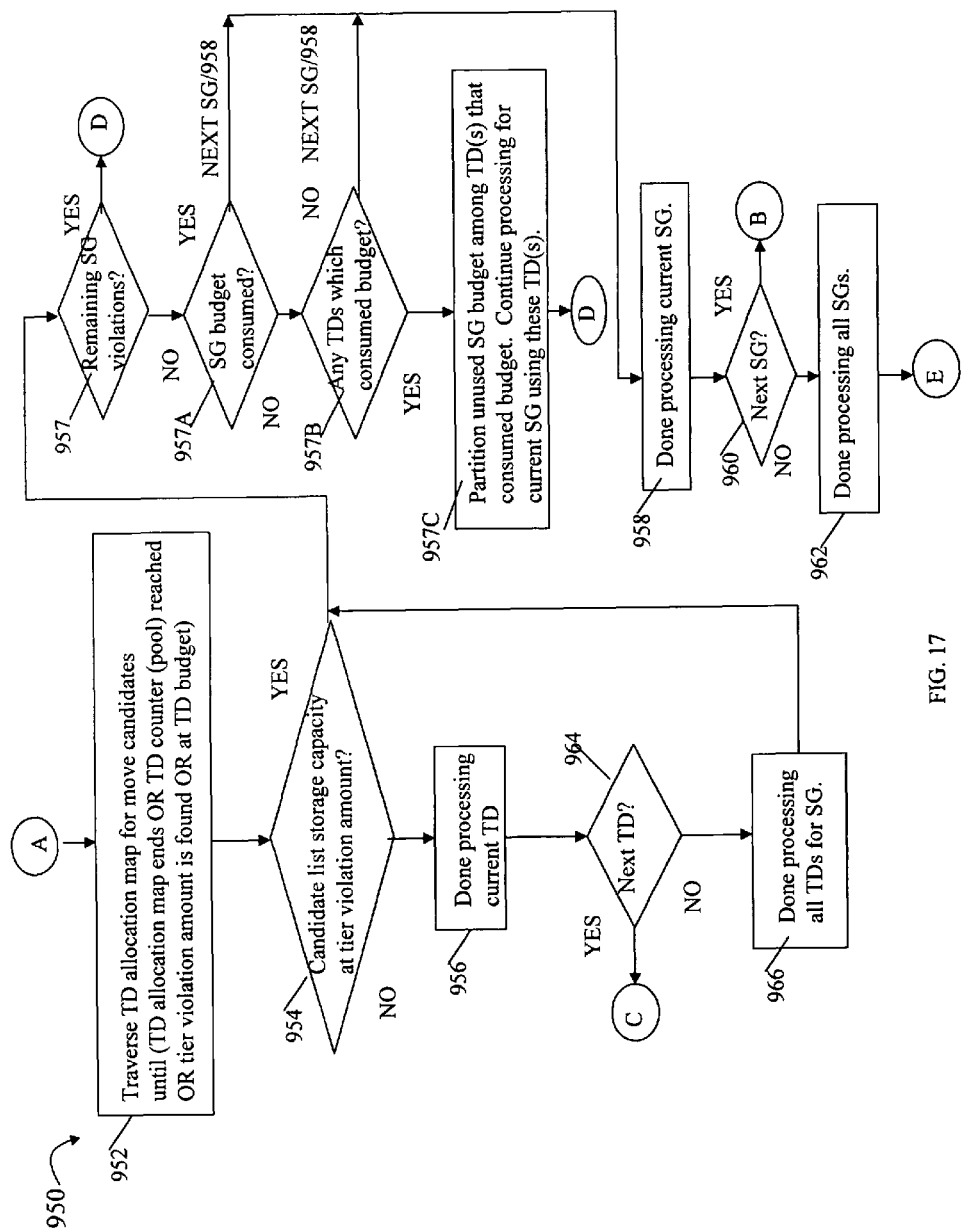
Figure 18:
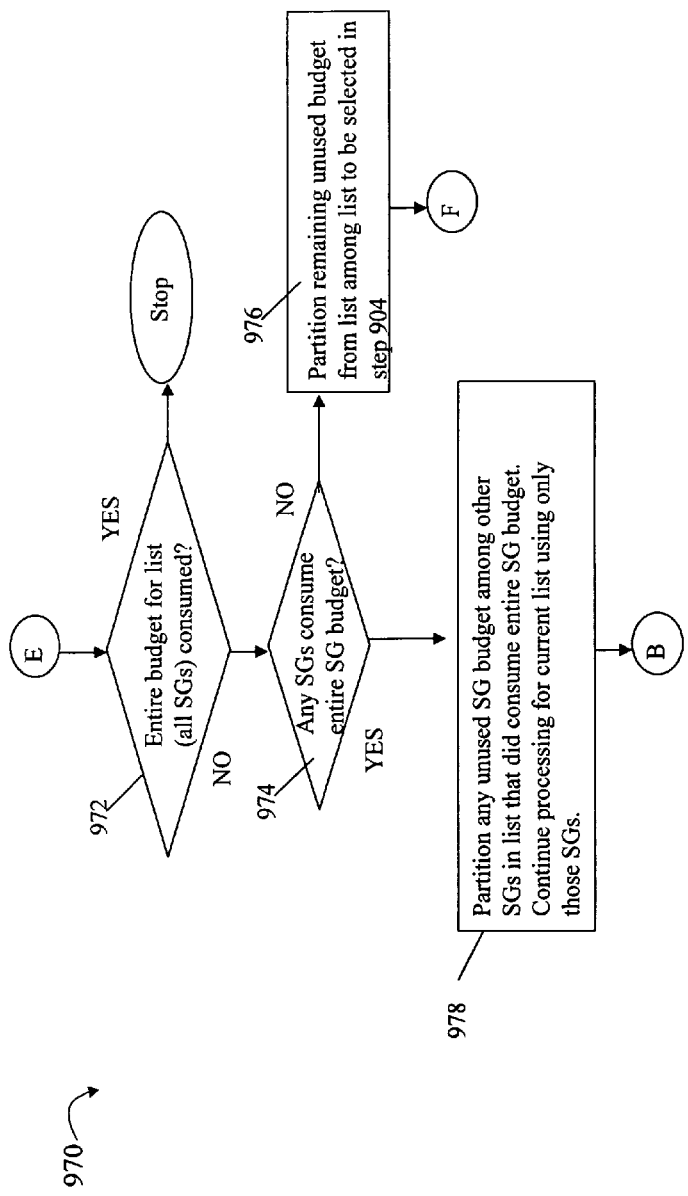

Referring to FIGS. 16, 17 and 18, shown are more detailed processing steps that may be performed in an embodiment in connection with step 856 of FIG. 15. Processing of FIGS. 16, 17 and 18 may be performed at each occurrence of a predefined time period or budget period as well as in response to the occurrence of one or more other events in an embodiment. For simplicity of illustration, other examples set forth herein assume that a single pool exists for each storage tier although an embodiment may have a storage tier of multiple pools. In this case, any storage tier capacity violations consider all storage pools of each storage tier. At step 902, each capacity violation list or queue of SG entries is sorted based on SG timestamps. At step 904, a priority and associated list is selected. Step 904 may use a weighted selection process using relative frequencies associated with the lists as described above. At step 906, within the selected list, a budget is determined for each SG of the selected list and, within each SG, a budget for each TD. Step 906 may include partitioning the budget among the SGs and then further partitioning each SG budget among those TDs in each SG. In one embodiment, each SG may receive a same SG budget. At step 910 one of the SGs from those on the list is selected. As described above, such selection of an SG may be made using a timestamp associated with each of the entries on the list to select the oldest such entry and associated SG. Additionally, as part of step 910 processing, the timestamp associated with the selected SG entry is updated to indicate this latest selection time.

At step 912, for the selected SG, a determination is made as to which one or more storage tiers have one or more capacity violations using the SG level counters. In an embodiment having multiple pools per storage tier, the aggregate or sum contribution of all pools of a single storage tier are considered by adding the corresponding storage pool counters at the SG level for all pools in each tier. An embodiment may track, such as in a list, the capacity violations for the one or more tiers. At step 913, one of the capacity violations of a storage*tier is selected for processing. At step 914, it is determined which TDs of the selected SG have data stored on devices of the violated storage tier. Step 914 may be performed using TD level counters. At step 916, one of the TDs of the SG determined in step 910 is selected. Step 916 selection processing may be made using timestamps associated with TDs of the SG as described above so that the TD having the oldest or earliest timestamp is selected. Additionally, the timestamp of the selected TD is also updated to indicate this latest selection time thereby affecting the next time this TD is selected.

At step 952, the TD allocation map for the TD selected in step 916 is traversed for move candidates. Step 952 may continue to process the TD's allocation map until one of several conditions occurs. The conditions may include determining that the entire TD allocation map has been traversed, the TD level counter for the current storage pool has been reached (e.g., candidates equaling the storage pool TD level counter have been considered), the amount of storage associated with the current data movement candidates is at least that of the tier violation amount, or the TD budget is consumed. In an embodiment having multiple pools in a storage tier, step 952 may be performed with respect to each storage pool and associated TD level counter. For example, if an embodiment has two pools in a storage tier having a capacity violation, step 952 may first be performed to determine data movement candidates of a first of the two pools and with respect to the TD level counter for the first pool. Subsequently, step 952 may be performed to determine data movement candidates of the second of the two pools and with respect to the TD level counter for the second pool. In connection with step 952, a TD's allocation map may be marked or tracked regarding the last chunk associated with a traversal in order to allow a subsequent traversal to resume from the last marked or track point of use.

Following step 952 is step 954 where a determination is made as to whether the candidate list has a total storage capacity at least that of the tier violation amount (e.g., the amount by which the tier's maximum threshold is exceeded). If step 954 evaluates to no, control proceeds to step 956 where processing is complete for the current TD. At step 964, a determination is made as to whether all TDs of the currently selected SG have been processed or examined with respect to the current capacity violation. In other words, step 964 determines whether or not all TDs have been examined for data movement candidates for the currently selected capacity violation of the current SG. If not, control proceeds to step 916. Otherwise, control proceeds from step 964 to step 966 where it is determined that processing for all TDs of the current SG is completed with respect to the currently selected capacity violation. Control proceeds to step 957. If step 954 evaluates to yes, control proceeds to step 957. At step 957, a determination is made as to whether there are any remaining capacity violations for the current SG which have not yet been considered. If so, control proceeds to step 913 to process the next storage tier capacity violation for the currently selected SG. Otherwise, if step 957 evaluates to no, control proceeds to step 957A wherein a determination is made as to whether the current SG's budget has been consumed. If step 957A evaluates to yes, control proceeds to step 958. If step 957A evaluates to no, control proceeds to 957B where a determination is made as to whether there are any one or more TDs in the currently selected SG which did consume their entire TD budget. If step 957B evaluates to no, control proceeds to step 958. If step 957B evaluates to yes, control proceeds to step 957C where the unused SG budget is partitioned among a set of the one or more TDs that had already consumed their TD budgets. Control may proceed to step 913 to continue processing for the current SG using this set of one or more TDs rather than all TDs for the current SG. It may be assumed that the TDs which did not consume their budgets have no further chunks to be considered as data movement candidates to reduce or alleviate current capacity violations. Step 957C may include resetting a pointer, counter, or other tracking means to the beginning of the list of storage tier violations in order for processing of step 913 to continue anew with respect to considering all storage violations. At step 958, it is determined that capacity violation processing is complete for the currently selected SG. At step 960, a determination is made as to whether there are any SGs have been processed for the current list traversal or iteration commenced in step 902. If so, control proceeds to step 910 where a next SG is selected. Otherwise control proceeds to step 962 where it is determined that the current iteration or traversal through SGs of a list is complete. In step 972, a determination is made as to whether the entire budget for the list has been consumed. In other words, step 972 determines at the SG level whether all SGs have consumed their entire SG budgets. If so, processing stops. If step 972 evaluates to no, control proceeds to step 974 to determine whether there are any SGs that did consume their entire SG budget. If step 974 evaluates to no, control proceeds to step 976 where the remaining unused budget for the currently selected list is used as the carryover or rollover budget to be partitioned among SGs in a list next selected in step 904. From step 976, control proceeds to step 904. If step 974 evaluates to yes, control proceeds to step 978. Step 978 may include determining a set of those SGs in the current list which did consume their entire SG budget. Any unused budget from the list of current SGs is partitioned among those SGs in the set (e.g., those SGs that did consume their entire SG budgets). Control proceeds to step 910 to continue processing for the current list using only those SGs in the set.

In connection with the foregoing, in the event that there is any remaining unused portion of the total budget after all SGs in the selected list have been processed, the remaining unused portion of the total budget may then be used for another selected list. If an SG within a selected list of SGs does not consume its entire SG budget, then the remaining unused portion of the SG budget may be partitioned among remaining SGs in the list which did consume their entire SG budgets. If a TD within an SG does not use all of its TD budget, the unused portion of the TD budget may be partitioned among remaining TDs in the SG which did consume their entire TD budget. An embodiment may assume that, for a current budget period during which the capacity violation lists are being processed, any TD which does not consume its entire TD budget does not currently have any additional chunks for data movement candidates. Additionally, for such a current budget period, any SG which does not consume its entire SG budget does not currently have any additional chunks for data movement candidates. Thus, when repartitioning unused budget amounts for the current budget period, such TDs and SGs which have not consumed their budgets may not be further considered during the current budget period.

In connection with the foregoing, a budget is expressed in terms of an amount of data moved. An embodiment may utilize techniques herein with budgets expressed in terms of other units, such as units of processing time (e.g, CPU processing time) as well as one or more other resources of the system.

It should be noted that the processing of FIGS. 16-18 describe one way in which the techniques herein may be implemented. Those of ordinary skill in the art will appreciate that an embodiment in accordance with the techniques described herein may perform a variation of processing described. For example, processing of FIGS. 16-18 select an SG. A capacity violation is selected. Within the SG, each of the TDs are processed to search for data movement candidates with respect to the selected capacity violation prior to searching for data movement candidates with respect to any other capacity violations. Rather than the foregoing, an embodiment may select a TD and process the selected TD for data movement candidates with respect to all of the detected capacity violations prior to searching a next TD of the SG for any data movement candidates.

When considering whether a chunk of a TD as a data movement candidate, one or more criteria may be considered. As described above, a chunk may be a data movement candidate if it is located on a source device of a storage pool in a storage tier currently associated with a capacity violation. The target or location to which the chunk is moved may be in another pool and associated storage tier which does not currently have a capacity violation. Furthermore, movement of this chunk to the target should not trigger a capacity violation. Additionally, the criteria for data movement may also consider PRC values as described above so that a data movement does not violate any PRC value specified for a target pool. In an embodiment in which the allocation policy also includes lower bound thresholds, ranges, and the like, the criteria of whether a chunk is a candidate for data movement may also include compliance with such other policy specifications.

Figure 19:
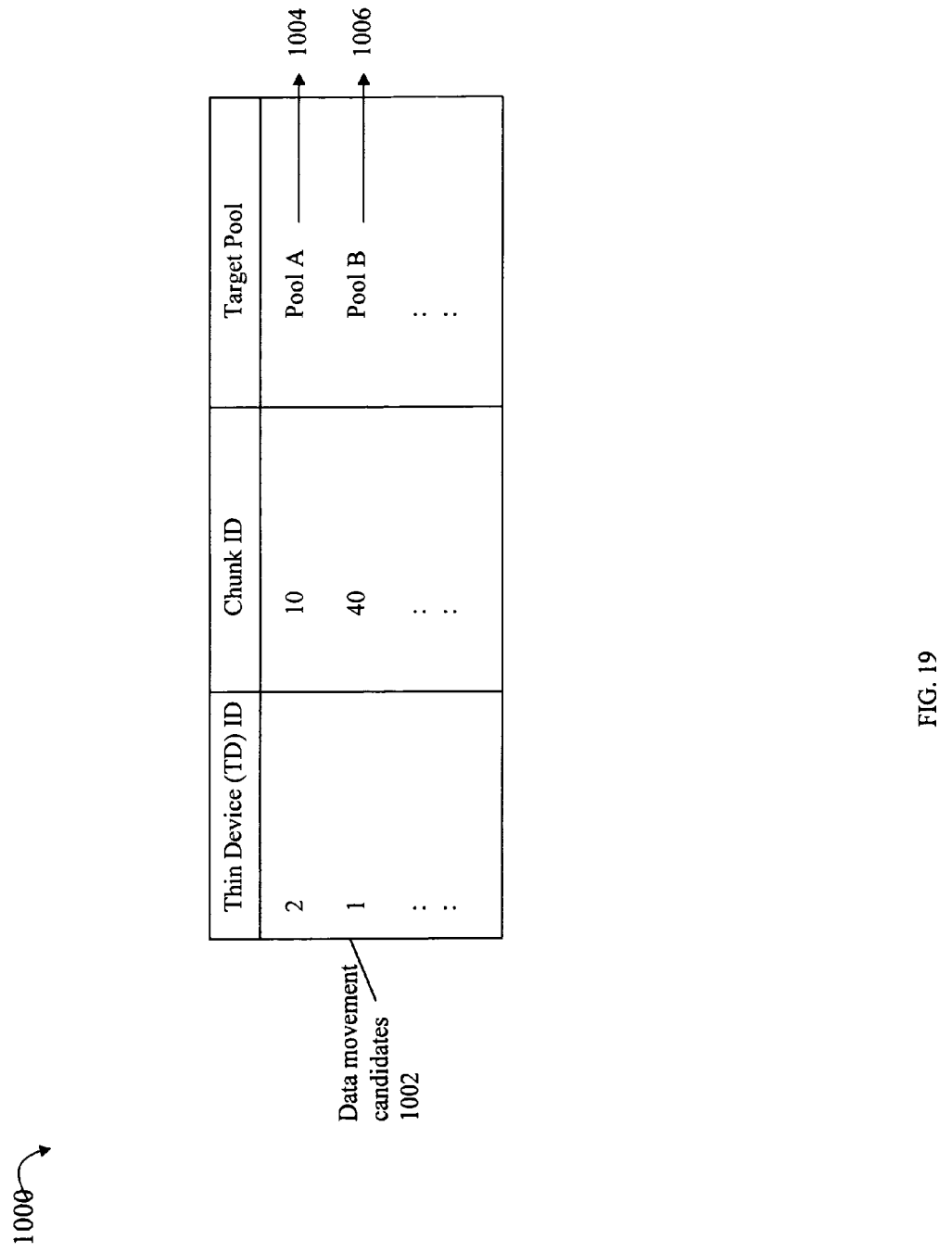
FIG. 19 is an example of a list of data movement candidates that may be used in an embodiment in accordance with techniques herein.

Referring to FIG. 19, shown is an example of a data movement candidate list that may be used in an embodiment in accordance with techniques herein. The list 1002 may be in the form of a table such as an array or linked list or other suitable data structure. The list 1002 may be produced as a result of processing the capacity violation lists or queues and identifies candidates for data movement from a storage tier currently in violation to another target pool and its associated tier. The list 1002 includes one or more entries each appearing as a row in the table. Example entries are rows 1004 and 1006. For each entry, the following is specified in three corresponding columns of the row: thin device identifier (TD ID), Chunk identifier (ID), and target pool. For example, entry 1004 identifies chunk ID 10 of TD 2 as a candidate for data movement to Pool A of a storage tier which is different from the storage tier in which TD2, chunk 10 is currently stored.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for enforcing an allocation policy comprising:
   receiving information describing a plurality of storage groups, each of said storage groups including one or more thin devices, each of said thin devices including a plurality of chunks of storage allocated on one or more of a plurality of storage tiers;
   determining, for each of said plurality of storage groups, a plurality of counters for said each storage group indicating amounts of storage currently allocated from said plurality of storage tiers for use by said each storage group; and
   determining, using said plurality of counters, whether each of said plurality of storage groups violates thresholds included in an allocation policy associated with said each storage group, each of said thresholds specifying a maximum amount of storage of one of said plurality of storage tiers that can be used by said each storage group, wherein a first of said plurality of storage groups is associated with a first allocation policy including a first threshold specifying a maximum amount of storage of a first of said plurality of storage tiers that can be used by said first storage group and wherein a second of said plurality of storage groups is associated with a second allocation policy including a second threshold different from the first threshold, wherein said second threshold specifies a maximum amount of storage of the first storage tier that can be used by said second storage group;
   wherein, for each of said one or more plurality of storage groups that violates thresholds included in the allocation policy associated with said each storage group, an entry is placed in one of a plurality of capacity violation queues;
   wherein said plurality of capacity violation queues includes a different queue for each of a plurality of priorities, each storage group that violates said thresholds having a first of said plurality of priorities and being placed in one of said plurality of capacity violation queues associated with said first priority; and
   wherein, if there are one or more storage groups violating one or more thresholds in said allocation policy, the method further comprises:
   processing said plurality of capacity violation queues to identify one or more data movement candidates, each of said data movement candidates identifying data of one of said storage groups having an entry in one of said plurality of capacity violation queues to be moved from a second of said plurality of storage tiers to a third of said plurality of storage tiers.

2. The method of claim 1, wherein, for each thin device in each of said plurality of storage groups, a plurality of counters is maintained indicating amounts of storage allocated from said plurality of storage tiers for use by said each thin device.

3. The method of claim 2, wherein, for each of said plurality of storage groups violating one or more thresholds in said allocation policy, the method further comprises:
   determining, using said plurality of counters maintained for each thin device, whether said each thin device has storage allocated from one of said plurality of storage tiers determined to have a threshold violation.

4. The method of claim 1, wherein each time storage of said plurality of storage tiers is allocated or deallocated for use by a first thin device in one of said plurality of storage groups, said plurality of counters for said one storage group and said plurality of counters maintained for said first thin device are appropriately updated in accordance with an amount of storage allocated or deallocated.

5. The method of claim 1, wherein said one or more data movement candidates are determined in accordance with alleviating or reducing a violation of one of said thresholds.

6. The method of claim 1, wherein each of said data movement candidates identifies one or more chunks of storage of said second storage tier which has data stored thereon for a first of said one or more thin devices of said each storage group, and wherein a current amount of storage of said second storage tier currently allocated for use by said each storage group violates one of said thresholds.

7. The method of claim 1, wherein said plurality of storage tiers includes a storage tier of one or more flash memory devices and another storage tier of one or more physical devices having lower performance characteristics than said one or more flash memory devices.

8. The method of claim 1, wherein each of said thresholds is any of a percentage of a total storage capacity of said each storage group, a percentage of a total storage capacity of one of said plurality of storage tiers, and an integer indicating an amount of storage units.

9. The method of claim 1, wherein said allocation policy is associated with at least two of said plurality of storage tiers and includes at least two maximum thresholds corresponding to said at least two plurality of tiers.

10. The method of claim 9, wherein a sum of the at least two maximum thresholds for said at least two plurality of tiers represents a storage capacity which is more than a storage capacity of said each storage group.

11. A method for enforcing an allocation policy comprising:
    receiving information describing one or more storage groups, each of said storage groups including one or more thin devices, each of said thin devices including a plurality of chunks of storage allocated on one or more of a plurality of storage tiers;
    determining, for each of said one or more storage groups, a plurality of counters for said each storage group indicating amounts of storage currently allocated from said plurality of storage tiers for use by said storage group; and
    determining, using said plurality of counters, whether each of said one or more storage groups violates thresholds included in an allocation policy associated with said each storage group, each of said thresholds specifying a maximum amount of storage of one of said plurality of storage tiers that can be used by said each storage group, and
    wherein for each of said one or more storage groups that violates thresholds included in azo allocations policy associated with said each storage group, an entry is placed in one of a plurality of capacity violation queues, and wherein said plurality of capacity violation queues includes a different queue for each of a plurality of priorities, each storage group that violates said thresholds having a first of said plurality of priorities and being placed in one of said plurality of capacity violation queues associated with said first priority, wherein, if there are one or more storage groups violating one or more thresholds in said allocation policy, the method further comprises:
    processing said plurality of capacity violation queues to identify one or more data movement candidates, each of said data movement candidates identifying data of one of said storage groups having an entry in one of said plurality of capacity violation queues to be moved from a first of said plurality of storage tiers to a second of said plurality of storage tiers.

12. The method of claim 11, wherein each of said data movement candidates alleviates or reduces an amount by which one of said thresholds is exceeded for one of said storage groups.

13. The method of claim 11, wherein a frequency is associated with each of said plurality of capacity violation queues, said frequency affecting an amount of times said each capacity violation queue is selected in said processing relative to others of said plurality of capacity violation queues.

14. The method of claim 11, wherein said second storage tier is determined using any of random selection of one of said plurality of storage tiers, performance characteristics of said second storage tier indicating a greater performance level than performance characteristics of said first storage tier, and a current work load associated with a portion of said first storage tier upon which said data is stored.

15. The method of claim 11, wherein said processing is performed using budgets associated with said plurality storage groups having entries in said plurality of capacity violation queues, and, for each of said plurality of storage groups having an entry in said plurality of capacity violation queues, budgets associated with thin devices of said storage group.

16. The method of claim 15, wherein said budgets are specified as amounts of data to be moved.

17. A non-transitory computer readable medium comprising code stored thereon for enforcing an allocation policy comprising, the non-transitory computer readable medium comprising code stored thereon that:
receives information describing a plurality of storage groups, each of said storage groups including one or more thin devices, each of said thin devices including a plurality of chunks of storage allocated on one or more of a plurality of storage tiers;
determines, for each of said plurality of storage groups, a plurality of counters for said each storage group indicating amounts of storage currently allocated from said plurality of storage tiers for use by said each storage group; and
determines, using said plurality of counters, whether each of said plurality of storage groups violates thresholds included in an allocation policy associated with said each storage group, each of said thresholds specifying a maximum amount of storage of one of said plurality of storage tiers that can be used by said each storage group, wherein a first of said plurality of storage groups is associated with a first allocation policy including a first threshold specifying a maximum amount of storage of a first of said plurality of storage tiers that can be used by said first storage group and wherein a second of said plurality of storage groups is associated with a second allocation policy including a second threshold different from the first threshold, wherein said second threshold specifies a maximum amount of storage of the first storage tier that can be used by said second storage group;

wherein, for each of said one or more plurality of storage groups that violates thresholds included in the allocation policy associated with said each storage group, an entry is placed in one of a plurality of capacity violation queues;

wherein said plurality of capacity violation queues includes a different queue for each of a plurality of priorities, each storage group that violates said thresholds having a first of said plurality of priorities and being placed in one of said plurality of capacity violation queues associated with said first priority; and wherein, if there are one or more storage groups violating one or more thresholds in said allocation policy, the method further comprises:

processing said plurality of capacity violation queues to identify one or more data movement candidates, each of said data movement candidates identifying data of one of said storage groups having an entry in one of said plurality of capacity violation queues to be moved from a second of said plurality of storage tiers to a third of said plurality of storage tiers.

* * * * *